US010977257B2

(12) United States Patent
Loring et al.

(10) Patent No.: US 10,977,257 B2
(45) Date of Patent: Apr. 13, 2021

(54) SYSTEMS AND METHODS FOR AUTOMATED AGGREGATED CONTENT COMMENT GENERATION

(71) Applicant: Pearson Education, Inc., New York, NY (US)

(72) Inventors: Miles T. Loring, North Liberty, IA (US); Paul S. Grudnitski, Torrance, CA (US); Vishal Kapoor, Iowa City, IA (US)

(73) Assignee: PEARSON EDUCATION, INC., New York, NY (US)

( * ) Notice: Subject to any disclaimer, the term of this patent is extended or adjusted under 35 U.S.C. 154(b) by 343 days.

(21) Appl. No.: 16/032,023

(22) Filed: Jul. 10, 2018

(65) Prior Publication Data

US 2019/0042578 A1 Feb. 7, 2019

Related U.S. Application Data

(63) Continuation of application No. 15/491,888, filed on Apr. 19, 2017, now Pat. No. 10,019,527, which is a
(Continued)

(51) Int. Cl.
| | |
|---|---|
| *G06F 16/00* | (2019.01) |
| *G06F 16/2457* | (2019.01) |
| *G09B 7/02* | (2006.01) |
| *G06F 16/31* | (2019.01) |
| *G06F 16/242* | (2019.01) |

(Continued)

(52) U.S. Cl.
CPC ...... *G06F 16/24578* (2019.01); *G06F 16/243* (2019.01); *G06F 16/248* (2019.01); *G06F 16/31* (2019.01); *G06F 16/338* (2019.01); *G06F 16/955* (2019.01); *G06Q 10/06398* (2013.01); *G09B 7/02* (2013.01); *G06Q 50/205* (2013.01)

(58) Field of Classification Search
CPC ............ G06F 16/24578; G06F 16/243; G06F 16/955; G06F 16/338; G06F 16/248; G06F 16/31; G06Q 10/06398; G06Q 50/205; G09B 7/02
See application file for complete search history.

(56) References Cited

U.S. PATENT DOCUMENTS

| | | | | |
|---|---|---|---|---|
| 6,024,577 A | * | 2/2000 | Wadahama | ............... G09B 5/14 434/322 |
| 8,321,463 B2 | * | 11/2012 | Cierniak | ................. G06F 16/00 707/791 |

(Continued)

*Primary Examiner* — Hung Q Pham
(74) *Attorney, Agent, or Firm* — Quarles & Brady LLP

(57) ABSTRACT

Systems and methods for automated aggregated content commenting are disclosed herein. Such a system can include a memory including a content database; an evaluation criteria database; and a comment database. The system can include at least one server. The at least one server can: receive a content identifier; receive a user identifier; provide a representation of the piece of content to the user; receive a comment from the user identifying a portion of the piece of content; generate a portion of the comment database linked to the user and the content; generate an entry in the portion of the comment database linked to the user and the content; and store the comment in the entry in the portion of the comment database.

18 Claims, 16 Drawing Sheets

Related U.S. Application Data continuation-in-part of application No. 14/252,402, filed on Apr. 14, 2014, now abandoned.

(60) Provisional application No. 61/811,347, filed on Apr. 12, 2013.

(51) Int. Cl.
*G06F 16/248* (2019.01)
*G06F 16/338* (2019.01)
*G06F 16/955* (2019.01)
*G06Q 10/06* (2012.01)
*G06Q 50/20* (2012.01)

(56) References Cited

U.S. PATENT DOCUMENTS

| | | |
|---|---|---|
| 8,753,200 B1 | 6/2014 | Supanc et al. |
| 10,019,527 B2 | 7/2018 | Sadauskas et al. |
| 2002/0142278 A1 | 10/2002 | Whitehurst et al. |
| 2004/0033475 A1 | 2/2004 | Mizuma et al. |
| 2004/0202991 A1 | 10/2004 | Clark et al. |
| 2007/0234194 A1 | 10/2007 | Tsuchiya et al. |
| 2008/0038705 A1 | 2/2008 | Kerns et al. |
| 2008/0040370 A1 | 2/2008 | Bosworth et al. |
| 2009/0063408 A1 | 3/2009 | Bao et al. |
| 2009/0075709 A1 | 3/2009 | Park |
| 2010/0070510 A1 | 3/2010 | Agarwal et al. |
| 2010/0159438 A1 | 6/2010 | German et al. |
| 2011/0117534 A1 | 5/2011 | Berger et al. |
| 2011/0145219 A1 | 6/2011 | Cierniak |
| 2011/0191286 A1 | 8/2011 | Cho |
| 2012/0040326 A1 | 2/2012 | Larson-Rutter et al. |
| 2012/0078653 A1 | 3/2012 | Sachs et al. |
| 2012/0151347 A1 | 6/2012 | McClements |
| 2012/0221687 A1 | 8/2012 | Hunter et al. |
| 2012/0244505 A1 | 9/2012 | Lang et al. |
| 2012/0303635 A1 | 11/2012 | Summers |
| 2014/0089801 A1 | 3/2014 | Agrawal |
| 2014/0272911 A1 | 9/2014 | York et al. |
| 2014/0295957 A1 | 10/2014 | Supanc et al. |
| 2014/0308650 A1 | 10/2014 | Loring et al. |
| 2017/0155790 A1 | 6/2017 | Tanaka |

\* cited by examiner

SYSTEMS AND METHODS FOR AUTOMATED AGGREGATED CONTENT COMMENT GENERATION

CROSS-REFERENCES TO RELATED APPLICATIONS

This application is a continuation of U.S. application Ser. No. 15/491,888, filed on Apr. 19, 2017, which is a continuation-in-part of U.S. application Ser. No. 14/252,402, filed on Apr. 14, 2014, and entitled "EVALUATION CONTROL", which claims the benefit of U.S. Provisional Application No. 61/811,347 filed on Apr. 12, 2013, and entitled "EVALUATION CONTROL", the entirety of each of which is hereby incorporated by reference herein.

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notifications and can be received via e-mail, phone, text message, or fax. Notifications have many applications for businesses, governments, schools, and individuals.

BRIEF SUMMARY

One aspect of the present disclosure relates to a system for automated aggregated content commenting. The system includes memory including: a content database including content providable to a user; an evaluation criteria database including at least one metric for evaluation of the content; and a comment database, which comment database is linked to the content database and to the evaluation criteria database. The system can include at least one server that can: receive a content identifier that identifies a piece of content for providing to a user; receive a user identifier that identifies the user for receiving the piece of content; provide a representation of the piece of content to the user; receive a comment from the user identifying a portion of the piece of content; generate a portion of the comment database linked to the user and the content; generate an entry in the portion of the comment database linked to the user and the content; and store the comment in the entry in the portion of the comment database.

In some embodiments, each of the links between the entry in the portion of the comment database and the user and the content is a pointer. In some embodiments, the received comment includes at least one metric identifier indicating a link between the received comment and the at least one metric for evaluation of the content. In some embodiments, the at least one server can generate the entry in the portion of the comment database also linked to the at least one metric for evaluation of the content in the evaluation criteria database.

In some embodiments, the content includes at least one of: a video file; and an audio file. In some embodiments, the comment includes a time stamp identifying a portion of the at least one of: the video file and the audio file relevant to the comment. In some embodiments, the comment includes a comment body including a text string generated via user input. In some embodiments, the at least one server can launch a commenter interface. In some embodiments, the representation of the piece of content is provided to the user via the commenter interface.

In some embodiments, the representation of the piece of content is not a downloaded version of the content. In some embodiments, the storing of the comment does not change the piece of content. In some embodiments, the at least one piece of content is provided streaming via the commenter interface.

One aspect of the present disclosure relates to a method for automated aggregated content commenting. The method includes: receiving a content identifier, which content identifier identifies a piece of content for providing to a user; receiving a user identifier at an at least one server from a user device, which user identifier identifies the user for receiving the piece of content; providing a representation of the piece of content to the user; receiving at the at least one server a comment from the user identifying a portion of the piece of content; generating with the at least one server a portion of a comment database linked to the user and the content; generating with the at least one server an entry in the portion of the comment database linked to the user and to the content; and storing with the at least one server the comment in the entry in the portion of the comment database.

In some embodiments, providing the representation of the piece of content to the user includes providing the representation of the piece of content to the user device. In some embodiments, providing the representation of the piece of content to the user device includes streaming the piece of content to the user device. In some embodiments, each of the links between the entry in the portion of the comment database and the user and the content is or includes a pointer.

In some embodiments, the received comment can include at least one metric identifier indicating a link between the received comment and the at least one metric for evaluation of the content. In some embodiments, the entry in the portion of the comment database can be linked to the at least one metric for evaluation of the content in the evaluation criteria database. In some embodiments, the content includes at least one of: a video file; an image file; and an audio file. In some embodiments, the comment includes a time stamp identifying a portion of the at least one of: the video file and the audio file, relevant to the comment. In some embodiments, the method includes launching a commenter interface. In some embodiments, the representation of the piece of content is provided to the user via the commenter interface.

One aspect of the present disclosure relates to a method of applying an evaluation. The method includes: receiving a portfolio; providing an artifact to a user; receiving a tag linking a portion of the artifact to a portion of an evaluation criterion; and applying an evaluation to the artifact generated based on the received tag.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
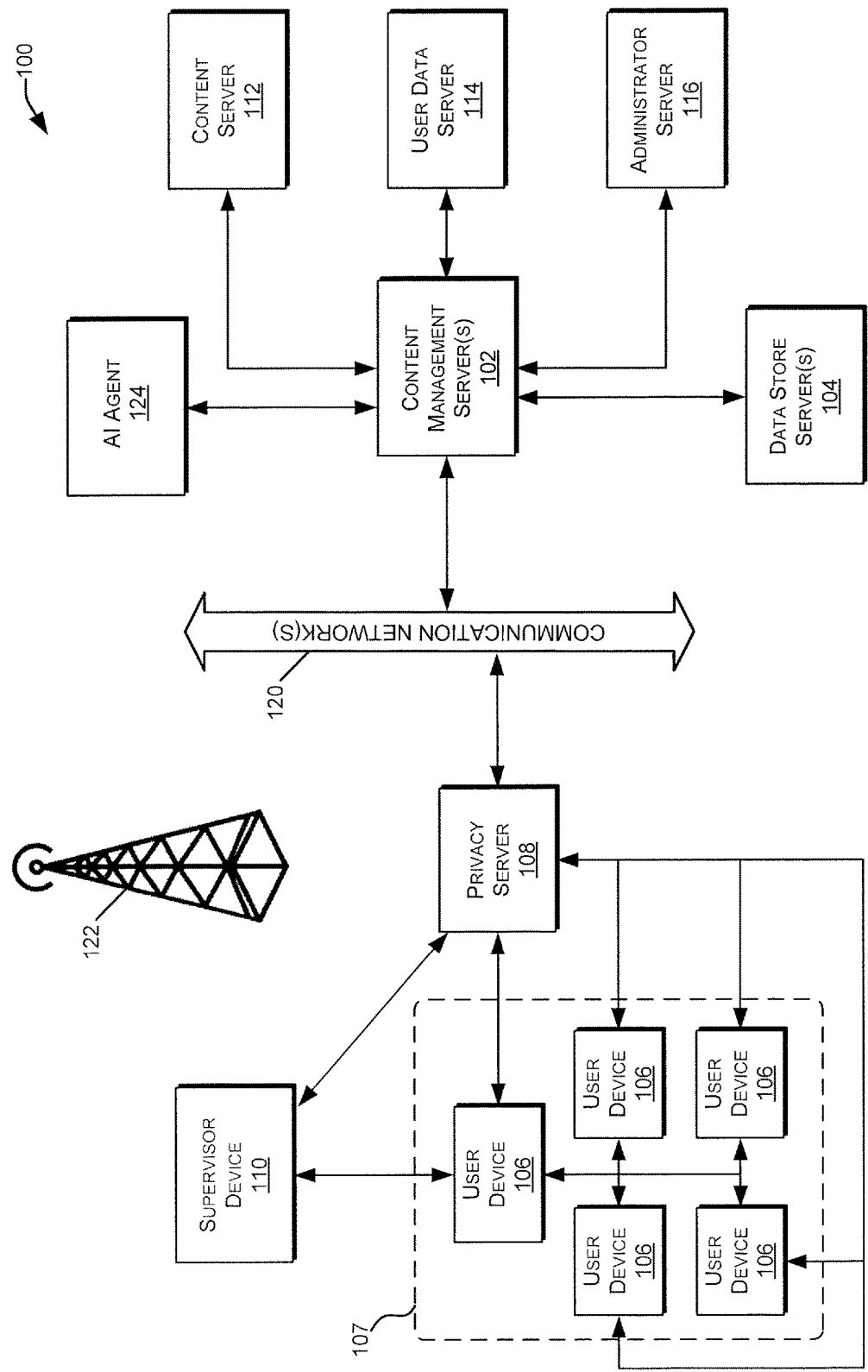
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, virtual reality devices such as, for example, virtual reality headsets, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein.

Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
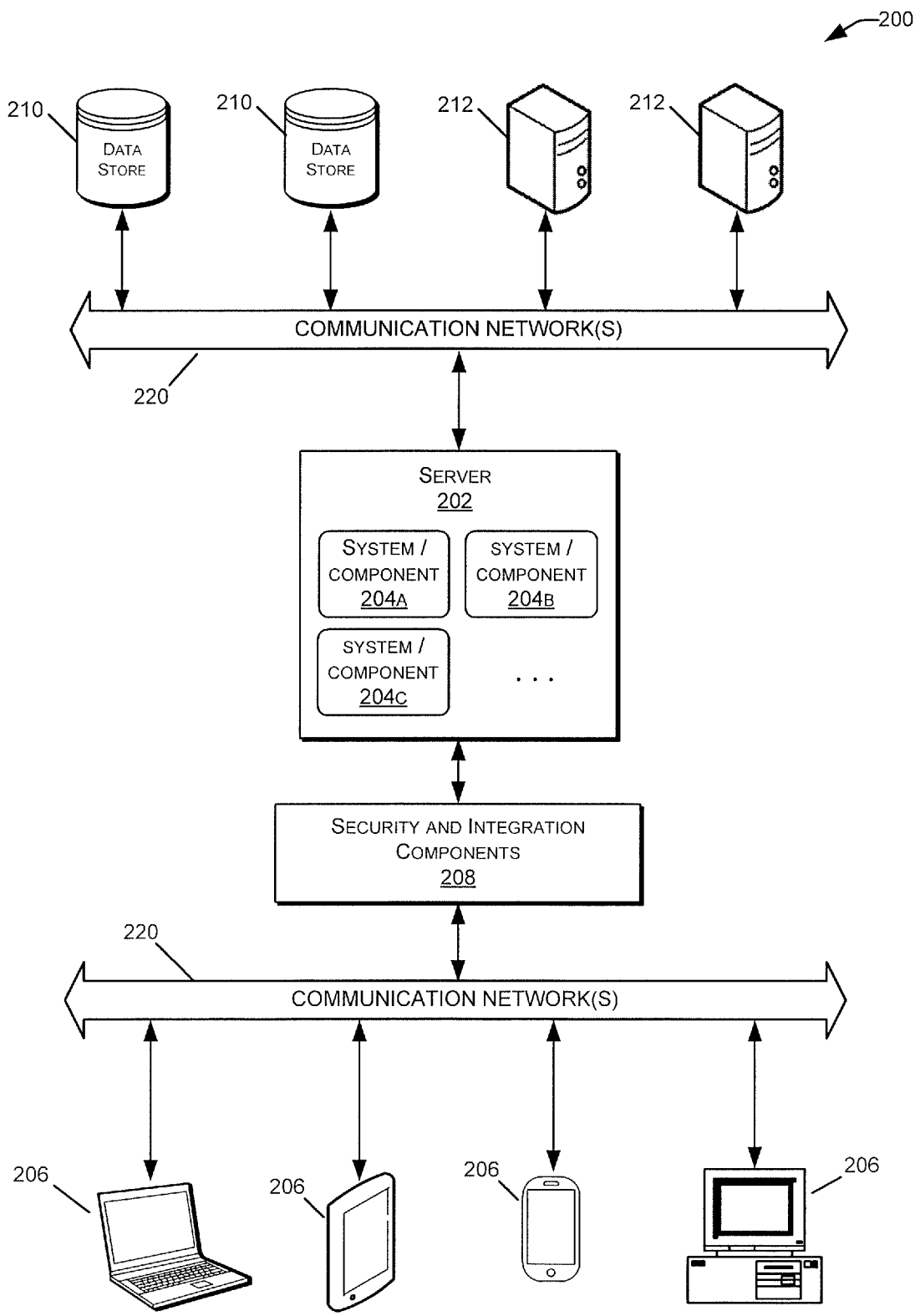
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
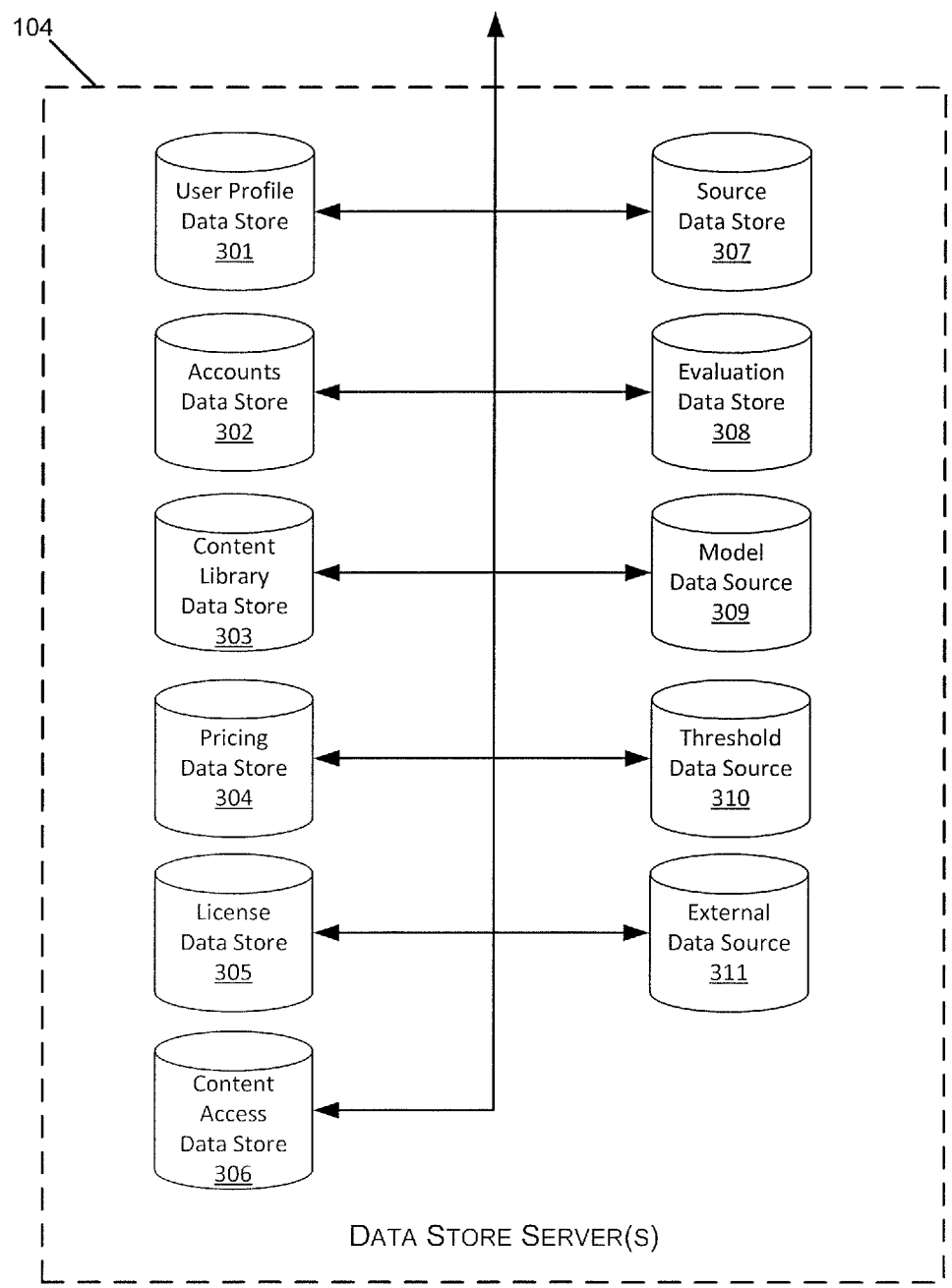
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library database 303 can include a plurality of content components. The content components can, in some embodiments, comprise one or several tasks, questions, activities, or the like that can be combined together to create a single piece of content, also referred to herein as a content aggregation or form, such as, for example, a single assignment, quiz, test, or evaluation. In some embodiments, these single content components can be each associated with information. This information can be generated from user interaction with the content of the single components. In some embodiments, this information can, for example, characterize a reliability of the single item, a difficulty of the single item, a differentiation of the single item, one or several averages of the single item, one or several standard deviations of the single item, or the like. In some embodiments, the differentiation of the single item can characterize the degree to which correctly or incorrectly responding to the item delineates between skill levels, attribute levels, or the like. In some embodiments, information associated with single items can be used to determine a reliability of a combination of multiple items.

In some embodiments, the content library database 303 can comprise one or several forms that can each include a plurality content components. In some embodiments, these forms can be created by a user of the CDN 100 from the content components stored in the content library database 303. In some embodiments, some or all of these one or several forms can be characterized by, for example, one or several scores or statistical measures. These scores or statistical measures can include a reliability coefficient such as, for example, a Cronbach's α, an error score or value such as, for example, a standard error of measurement (SEM) score, or the like. In some embodiments, one or several of these scores can be calculated based on the information associated with each of the content components. In some embodiments, these one or several scores of the form can be calculated in real-time and in some embodiments, one or several scores for alternative forms can be calculated to allow the recommendation of one or several content components for inclusion in the form and/or for removal from the form. In some embodiments, these one or several scores can vary based on one or several attributes of the intended recipient and/or recipients of the form. These one or several attributes can include, for example, gender, age, education, intelligence, or the like.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

In some embodiments, the content library database 303 can include sub databases containing content generated by one or several users including, for example, a content database and/or a comment database. In some embodiments, for example, content can be associated with a group of users such as a group of users in a course, a class, a training group, or the like, which uses can include, one or several students, trainees, or the like. In some embodiments, this group of users can further include one or several teachers, trainers, professors, or the like. This content can be generated by one of the users or can be generated by a source other than one of the users. This content can, in some embodiments, comprise a plurality of pieces of content each of which pieces of content can be generated by one or several of the users. In some embodiments such as when the group of users is in a course, each of the pieces of content can be generated by one or several users as part of an assignment, a test, a quiz, or the like. The content can comprise, the video file, and audio file, text file, and image file, or the like.

The comment database can comprise comments relating to one or several of the pieces of content in the content database. The comments can be generated by one or several of the users. The comment database can be, in some embodiments, independent of the content database such that a change to the comment database does not change the content database. Similarly, in some embodiments, the comment database is independent of the content database such that a change to the content database does not change the comment database. In such embodiments, the comment database can include one or several pointers associated with entries in the comment database linking those entries to pieces of content in the content database. The Scott comments stored in the comment database as entries can be linked to the appropriate one of the pieces of content in the content database via the one or several pointers. In some embodiments, each entry in the content database can include information identifying the one or several pieces of content associated with the entry, comment content, data identifying one or several evaluation criteria or evaluation metrics associated with the content, or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In some embodiments, the evaluation database 308 can comprise a sub database identified herein as the evaluation metric database. In some embodiments, the evaluation metric database can identify one or several criteria, metrics, rubrics, or the like for use in evaluating one or several of the one or several pieces of content in the content database. In some embodiments, the one or several metrics can each define one or several metric subcomponents and provide information for generating one or several values characterizing each of those one or several metric subcomponents. In some embodiments, the evaluation metric database can be independent of one or both of the content database and the comment database. In some embodiments, some or all of the entries in the comment database can be linked to one or several of the metrics, rubrics, criteria, or the like in the evaluation metric database. In one embodiment, for example, each entry in the comment database can be linked to a metric in the evaluation metric database, and specifically each entry in the comment database can be linked to one or several of the metric subcomponents within one of the metrics in the evaluation database. In some embodiments, this link can identify one or several metric subcomponents relevant to the comment.

In some embodiments, each metric in the evaluation metric database can be associated with metric metadata. This metric metadata can identify information relevant to the metric such as, for example, the course or section associated with the metric, the teacher associated with the metric, the assignment associated with the metric, or the like. The metric metadata can be stored in the evaluation metric database and can be linked to its associated metric(s).

A model data store 309, also referred to herein as a model database 309, can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
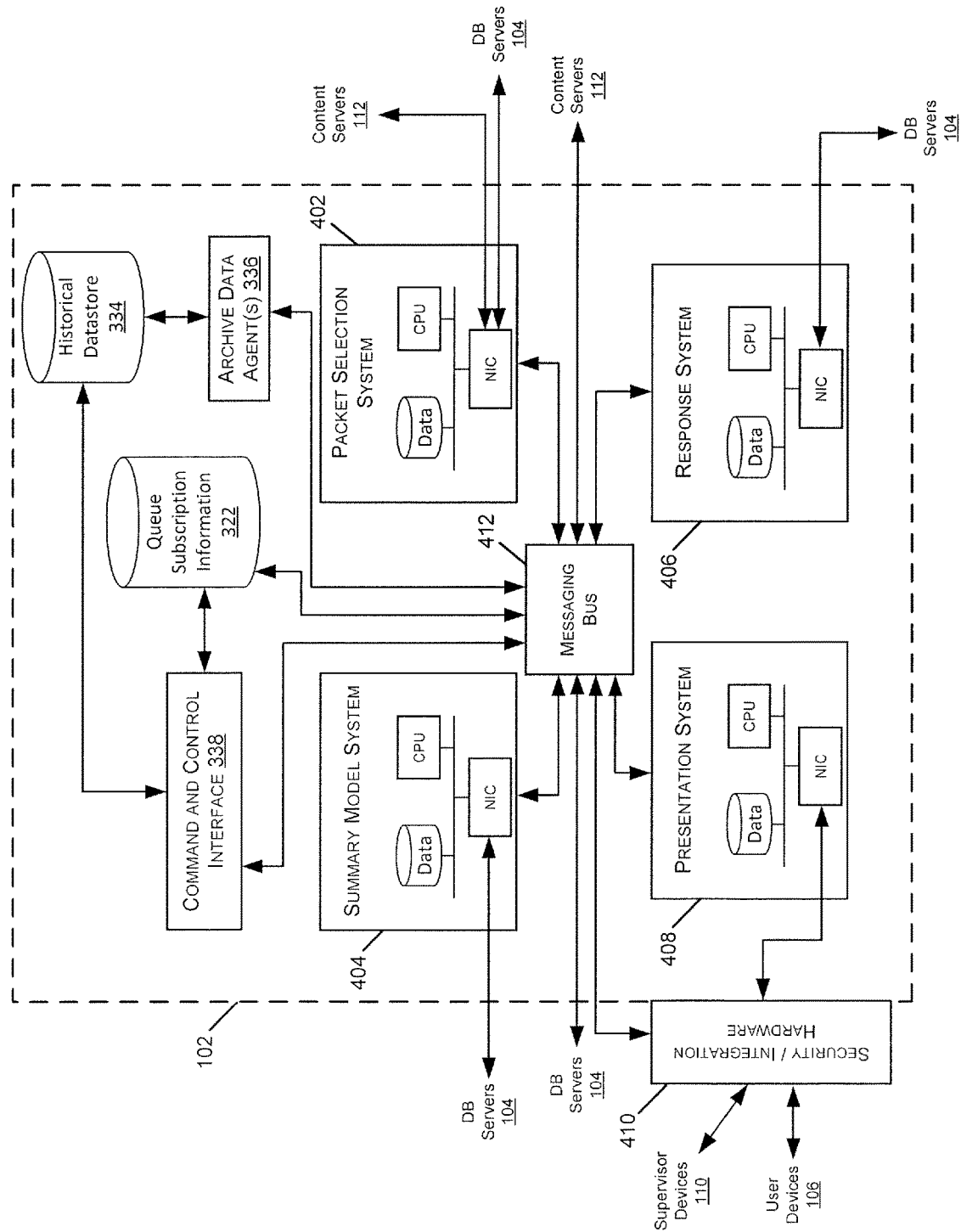
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; form reliability; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can optionally allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. In some embodiments, the internal processing subscriber 402-408 can receive a request for creation of a form, receive filter inputs from the user, provide content components corresponding to the filter inputs to the user, receive selections of content components for inclusion in the form, calculate a reliability of the form, generate recommended changes to the form, store the form, provide the form to a user, receive responses to the provided form, evaluate the responses, generate a score characterizing the received response, updating information relevant to the user, generating and providing an intervention or intervention recommendation, and providing the updated information relevant to the user.

The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets or content components, for providing to a user. In some embodiments, the recommendation engine can identify one or several content components for removal from a form and/or one or several content components for inclusion in a form. In some embodiments, these one or several content components can be identified based on their impact on the one or several scores or statistical measures characterizing the form.

In some embodiments, for example, the reliability of a form may be too low as compared to a threshold value. In such an embodiment, one or several content components in the form that are responsible for decreasing the reliability of the form can be identified for removal from the form and/or can be removed from the form. Similarly, in some embodiments in which the reliability is too low, one or several content components that are not in the form can be identified for inclusion in the form and/or can be included in the form. In some embodiments, one or several content components identified for inclusion in the form and/or identified for removal from the form can be identified to the creator of the form for confirmation of the removal of those one or several content components from the form and/or for the confirmation of the addition of those one or several content components to the form.

These content components can be selected based on, for example, the information retrieved from the database server 104 including, for example, the user profile database 301, the content library database 303, the model database 309, or the like. In some embodiments, these one or several data packets can be adaptively selected and/or selected according to one or several selection rules, to the determine reliability of a form or draft form, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like. In some embodiments, the summary model system 404 can generate a model, based on user response data, identifying a user's progress over time in developing a skill, an attribute, or the like. In some embodiments, this can include receiving a raw score generated by, for example, the response system 406 (discussed below), and generating a standardized score from that raw score. In some embodiments, for example, this can include the generation of a T-score from the raw score. In some embodiments, the T-score can be a standardized score that is positive and that has a mean of 50. In some embodiments, the T-score can characterize the number of standard deviations a raw score is above or below a mean. In some embodiments, the T-score can be used to standardize for age, gender, or any other attribute.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102.

The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100.

The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
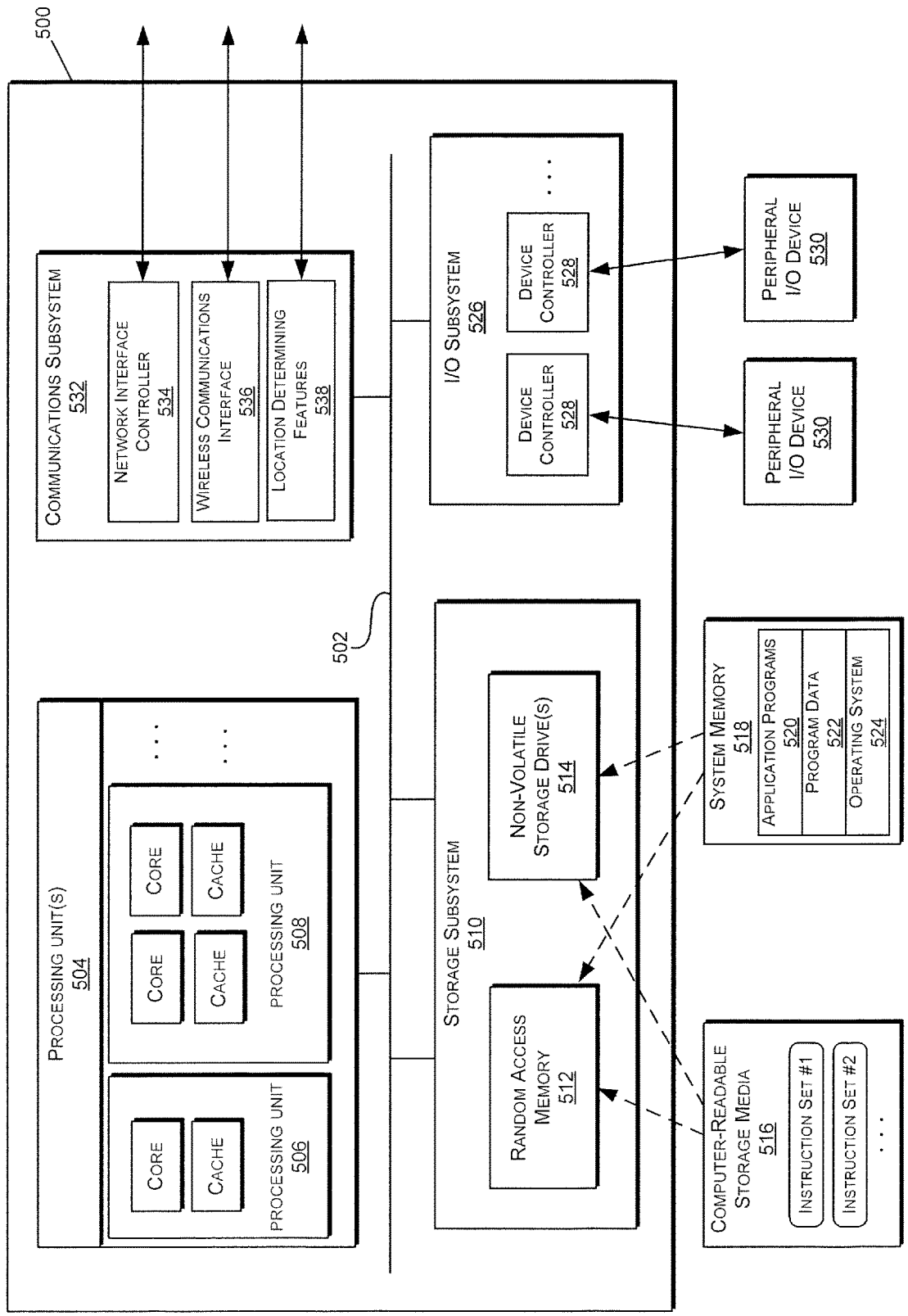
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a Fire-Wire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
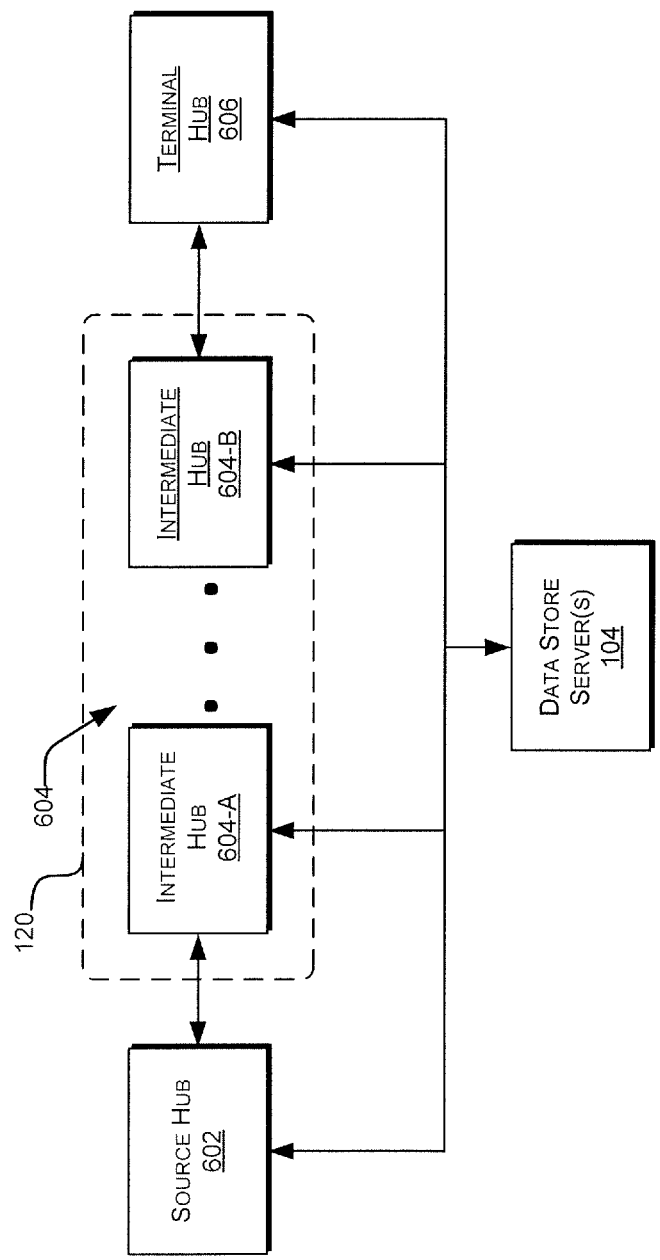
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiment, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
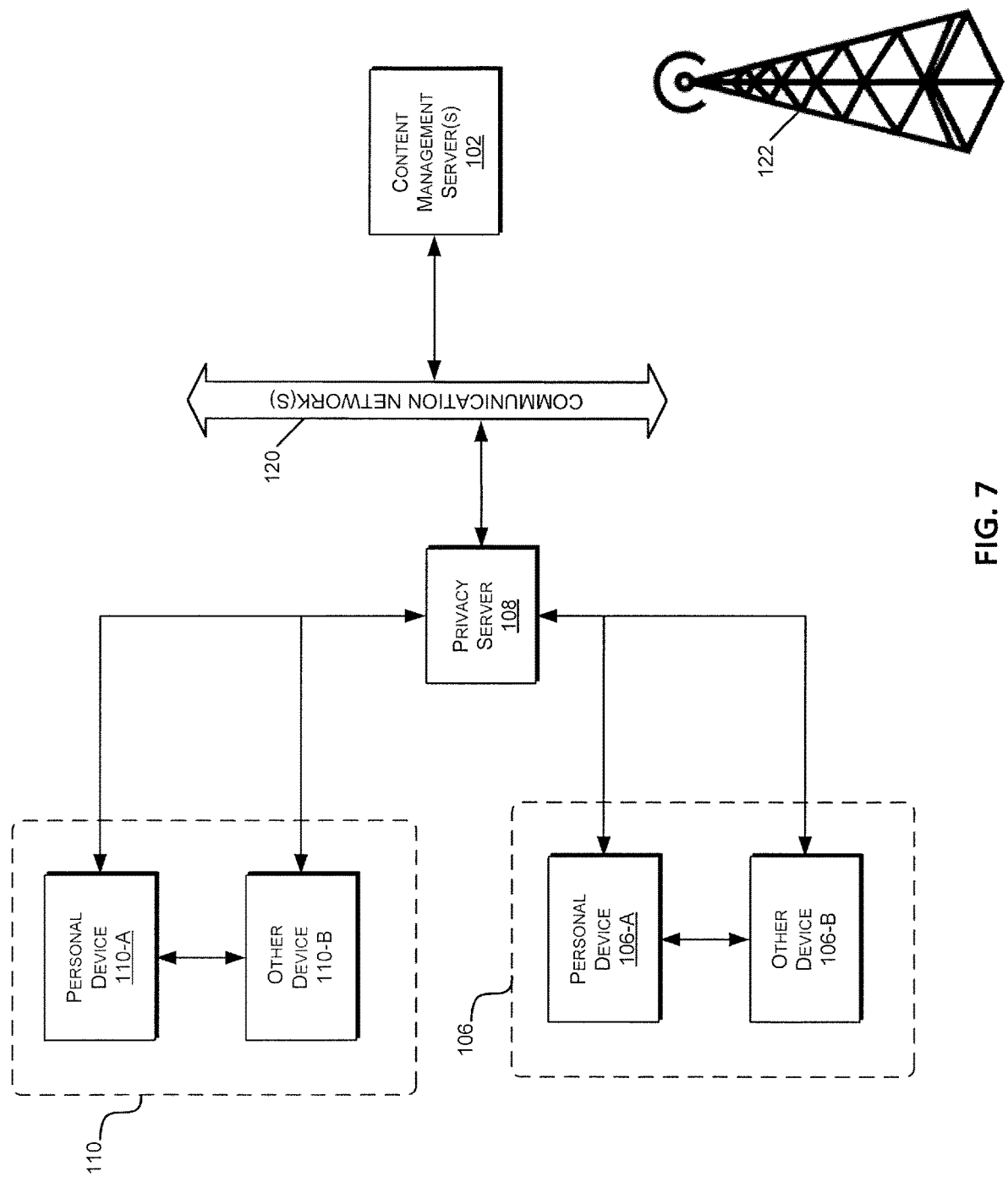
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor devices 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, the prompt can comprise an alert configured to trigger activation of the I/O subsystem of a user device 106 of a follow-up user, also referred to herein as a second user device, to provide a notification of the exceeded threshold In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using any other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
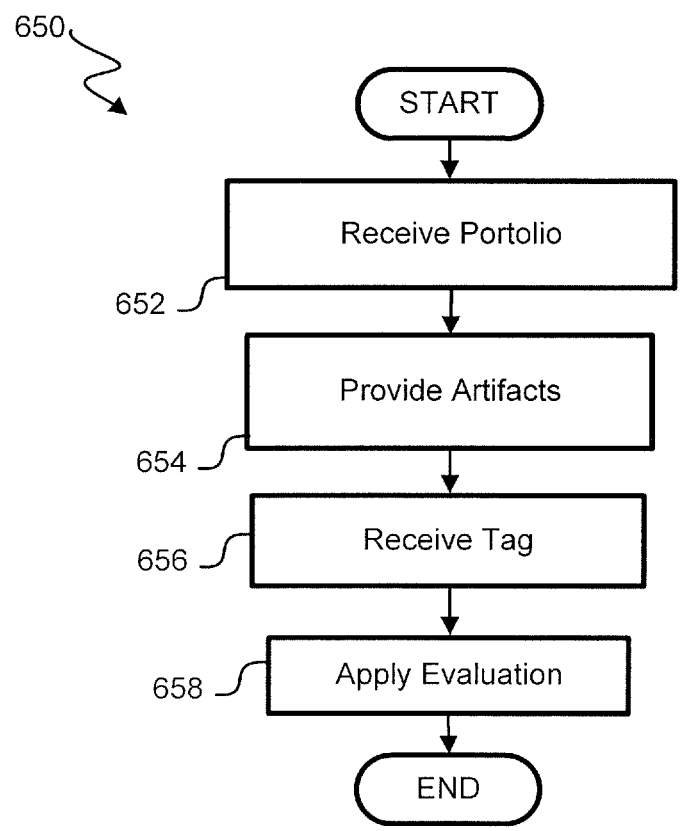
FIG. 8 is a flowchart illustrating one embodiment of a process for evaluation of one or several portfolios and/or artifacts.

With reference now to FIG. 8, a flowchart illustrating one embodiment of a process 650 for evaluation of one or several portfolios and/or artifacts is provided. In some embodiments, the artifact can comprise any work product and can include, for example, digital work product. In some embodiments, the digital work product can include written work product and/or recorded work product which can include sound and/or video recordings. In some embodiments, the process 650 can be performed by the Content Distribution Network 100 and/or components of the Content Distribution Network 100. Embodiments of systems and methods for evaluation of one or several portfolios are disclosed in U.S. application Ser. No. 14/252,402, filed on Apr. 14, 2014, the entirety of which is hereby incorporated by reference herein.

The process 650 begins at block 652 wherein a portfolio is received. In some embodiments, for example, the portfolio can be received by and/or from a component of the Content Distribution Network 100, and in one embodiment, the portfolio can be received from one of the components of the CDN 100 including, for example, one of the user devices 106, the database server 104 including, for example, the user profile database 301, the content library database 303, the external data source 311. In some embodiments, this work product can be generated by a user, and in some embodiments, this work product can be collected by one of the components of the CDN 100 including, for example, the user device 106. In some embodiments, after the portfolio has been received at, for example, the user device 106, the portfolio can be stored within the database server 104 including, for example, the user profile database 301, the content library database 303, the external data source 311.

After the portfolio has been received, the process 650 proceeds to block 654 wherein the artifacts are provided. In some embodiments, for example, the artifacts can be provided to the user via one of the user devices 106 or the supervisor device 110. In some embodiments, the portfolio can be authored by a user via a first user device 106 and can be provided in block 654 to a second user device 106 and/or to the supervisor device 110. In some embodiments, the user device 106 and/or the supervisor device 110 can provide the artifacts to the user I/O subsystem 526, and specifically via a user interface operated by the I/O subsystem 526. The artifacts can be retrieved from the one or several portfolios stored within the database server 104. In some embodiments, for example, the server 102 can query the database server 104 for one or several stored artifacts. In some embodiments, one or several artifacts can be selected from the database server 104, and can be provided to the user via the I/O subsystem 526 of the supervisor device 110 and/or of the user device 106.

After the artifacts have been provided, the process 650 proceeds to block 656 wherein a tag is received and/or applied. In some embodiments, for example, the tag can be received via one of the user devices 106 and/or the supervisor device 110, and can be stored in the database server 104. In one embodiment, a tag can be applied in that the tag, and the data relevant to the tag are stored in one of the databases of the database server 104. In one embodiment, for example, the tag can identify a portion of the artifact, can identify a portion of the evaluation criteria relevant to the portion of the artifact, can include a note relating to the evaluation criteria and/or to the tagged portion of the artifact, and/or can identify the user adding, removing, and/or editing the tag.

After the tag has been received, the process 650 proceeds to block 658 wherein the evaluation is applied. In some embodiments, for example, the evaluation can be applied based on the tags associated with the artifact and/or stored in the database server 104. In some embodiments, the evaluation can be applied based on the number of tags associated with one or several of the evaluation criteria and/or sub criteria and/or based on information relating to the evaluation criteria and/or sub criteria that do not have a related tag and/or have fewer related tags than a threshold value. The application of the evaluation can, in some embodiments, be received from the user via the user device 106 or the supervisor device 110 and/or generated by the processor 102.

Some embodiments of the present disclosure relate to systems and methods for applying comments to content. This content can include, one or several audio files, video files, image files, text files, augmented reality files, virtual reality files, simulation or simulation files, 3D and/or 4D video, tables, spreadsheets, graphs, musical notation files, and the like. In some embodiments, the application of comments to a file can include providing a representation of the content to the commenter, receiving an indication of placement of the comment from the commenter, and generating links between a comment database, a content database, and/or evaluation database, receiving comment content, and generating an entry in the comment database comprising the comment content. In some embodiments, the indication of placement of a comment can include, for example, one or several timestamps, one or several positions on a scrubber associated with the content, one or several X, Y coordinates within an image associated with the content, or the like. In some embodiments disclosed herein the application of comments to a file is done via links between a comment database and the file such that the file itself is not altered by the applied comments. This can, advantageously, illuminate and/or simplify file management problems that can arise when multiple different individuals attempt to simultaneously apply comments to the file.

Figure 9:
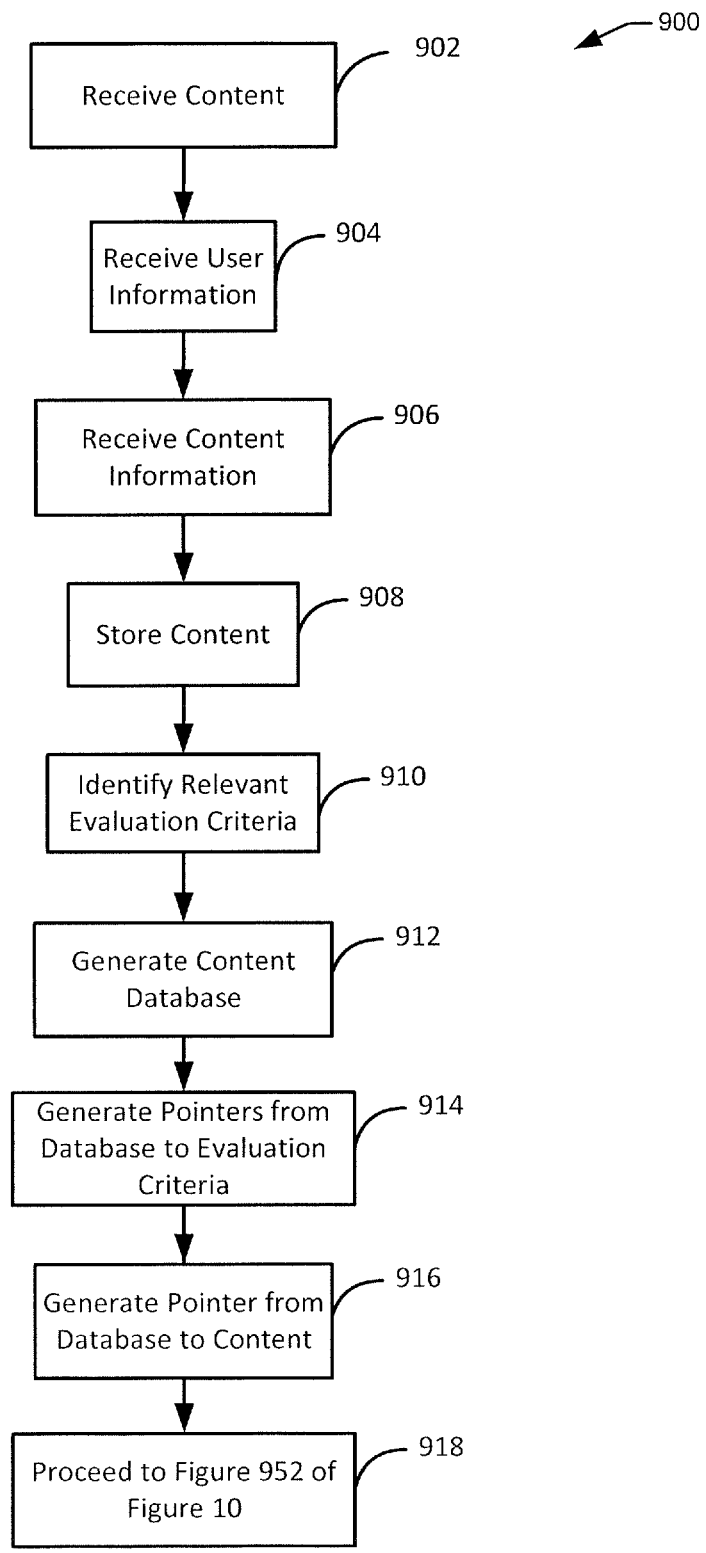
FIG. 9 is a flowchart illustrating one embodiment of a process for automatic generation of independent, linked comment databases.

With reference now to FIG. 9, a flowchart illustrating one embodiment of a process 900 for automatic generation of independent, linked comment databases is shown. The process 900 can be performed by all or portions of the content distribution network 100 including for example, one or several servers 102. The process begins a block 902 wherein content is received. This content, also referred to herein as the file, can comprise audio content, video content, image content, text content, augmented reality content, virtual reality content, simulation or simulation content, 3D and/or 4D video content, table or spreadsheet content, graph content, musical notation content, or the like. In some embodiments, the content can comprise different combinations of audio content, video content, image content, text content, augmented reality content, virtual reality content, simulation or simulation content, 3D and/or 4D video content, table or spreadsheet content, graph content, musical notation content, or the like. The content can be received by the server 102 from another component of the content distribution network 100. In some embodiments, for example, the content can be generated by the user at one of the user devices 106 and can be communicated to the server 102 via the communication network 120.

After the content has been received, the process 900 proceeds to block 904 where user information is received. In some embodiments, the user information can be information identifying the author of the content received in block 902. This can include, for example, the name of the user, a username, a unique user identifier, password, biometric user information, a user picture, or the like. The user information can be received initially by the user device 106, and specifically by the I/O subsystem 526 of the user device 106 from the user. The user information can then be received by the one or several servers 102 from the user device 106.

After the user information has been received, the process 900 proceeds to block 906 wherein content information is received. In some embodiments, the content information can identify one or several attributes of the content and can include, for example, content metadata. In some embodiments, the content information can identify an association between the content and one or several courses, assignments, classes, training programs, decrees, majors, schools, universities, or the like. In one embodiment, for example, the content information can identify, a school, a course or section, a teacher, and an assignment. The content information can be received from the user by the user device 106, and specifically by the I/O subsystem 526 of the user device 106 from the user. The content information can then be received by the one or several servers 102 from the user device 106 via the communications network 120.

After the content information has been received, the process 900 proceeds to block 908 wherein the content is stored. In some embodiments, the content can be stored in the database server 104 and specifically in one of the databases of the database server 104 such as, for example, user profile database 301, the content library database 303, and/or external data source 311. In some embodiments, the content can be stored in the content sub database within the content library database 303. In some embodiments, the storing of content further includes the storing of content data and/or of metadata associated with the content including, for example, the user information received in block 900 for and/or the content information received in block 906.

After the content has been stored, the process 900 proceeds to block 910 wherein one or several relevant evaluation criteria are identified. In some embodiments, this can include, for example, identifying one or several metrics from the evaluation metric database in the evaluation database 308 relevant to the content. This determination can be made based on the content metadata identifying, for example, the course, section, assignment, or the like. In some embodiments the relevant evaluation criteria and/or relevant evaluation metric can be identified based on metric metadata associated with metric stored in the evaluation metric database. In some embodiments, for example, information from the content metadata can be compared to information from metric metadata to determine a match between aspects of the content metadata and aspects the metric data such as, for example, a match between course or section, teacher, assignment, or the like. If the content metadata, or certain portions of the content data matches metric metadata, or certain portions of the metric metadata, then the evaluation metric associated with the metric metadata is identified as the relevant evaluation metric or evaluation criteria.

After the relevant evaluation criteria have been identified, the process 900 proceeds to block 912 wherein a comment database is generated. In some embodiments, the generation of the content database can include generation of a sub database within the content database for receiving and storing comments relevant to the content received in block 902. In some embodiments, this sub database can be specific to the comment, specific to the commenter, or the like.

After the comment database has been generated, the process 900 proceeds to blocks 914 and 916 wherein pointers from the comment database to the relevant evaluation criteria identified in block 910 and/or pointers from the comment database to the content received in block 902 are generated. In some embodiments, this can include linking the sub database within the content database with one or both of the content database in the evaluation metric database. Specifically, this can include linking the sub database within the content database with one or both of the content received in block 902 and the relevant evaluation criteria or evaluation metric identified in block 912. In some embodiments, these links can comprise one or several pointers.

Figure 10:
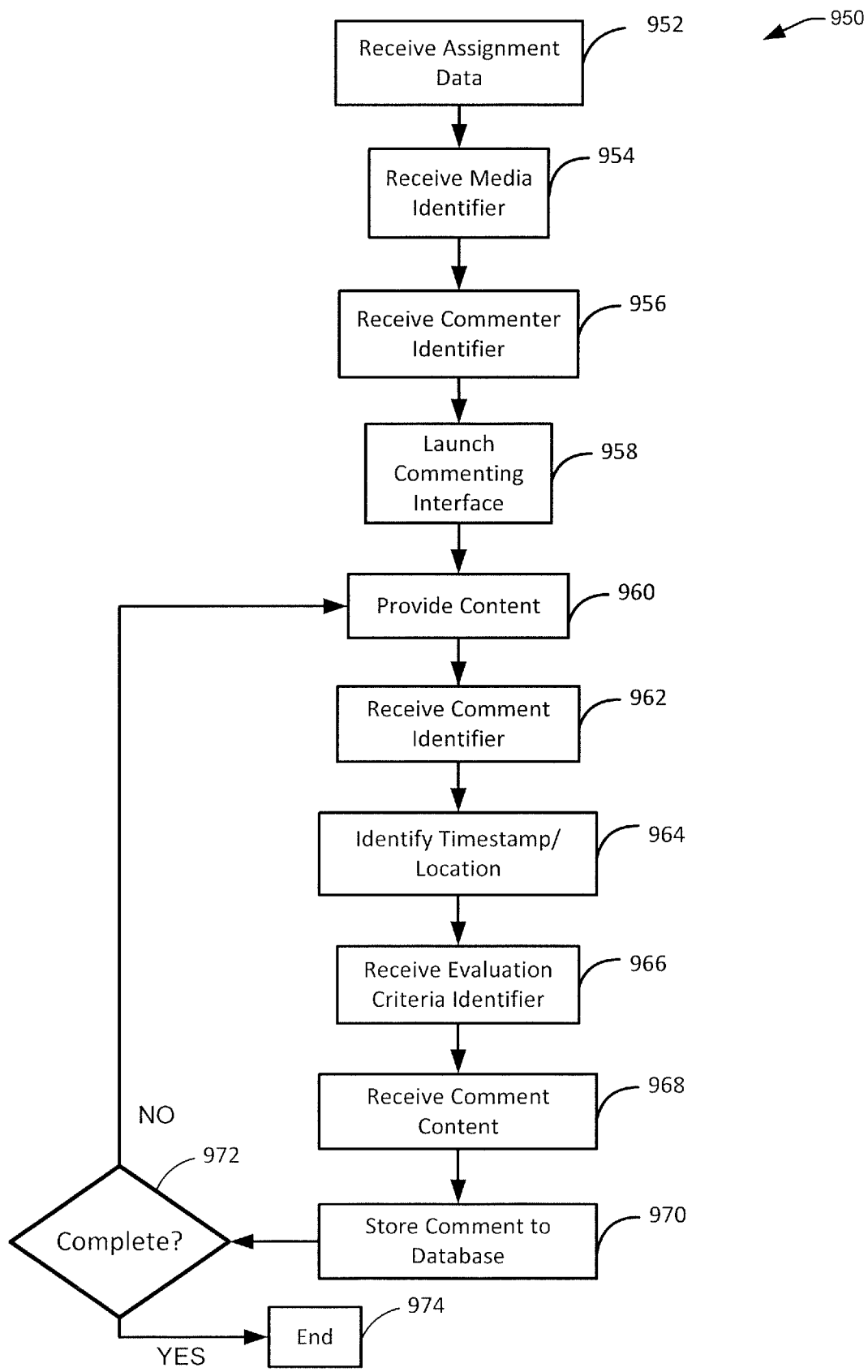
FIG. 10 is a flowchart illustrating one embodiment of a process for automatically receiving and storing comments.

After the generations of pointers as described in one or both of blocks 914 and 916, the process 900 advances to block 918 and proceeds to block 952 of FIG. 10.

With reference now to FIG. 10, a flowchart illustrating one embodiment of a process 950 for automatically receiving and storing comments is shown. In some embodiments, the process 950 can be performed by all or portions of the content distribution network 100. The process 950 can be performed subsequent to the completion of the process 900 or in connection with the process 900. In some embodiments, the process 950 can allow the receiving and storing of comments simultaneously from multiple commenters. In some such embodiments, and as described herein, the content is not downloaded to a user device 106 or a supervisor device 110, but is rather streamingly provided to any user device 106 or supervisor device 110 requesting said content. Further, as any received comments are stored in a comment database independent from the content, such comments do not change the content which thus allows simultaneous commenting by multiple users and/or supervisors.

The process 950 begins a block 952 wherein assignment data is received. In some embodiments, the assignment data can specify, for example, one or several pieces of content and/or one or several evaluation criteria. The assignment data can be received by the user device 106 from the user or by the supervisor device 110 from the supervisor. The assignment data can also be received by the one or several servers 102 from the user device 106 or from the supervisor device 110.

After the assignment data has been received, the process 950 proceeds to block 954 wherein a media identifier, also referred to herein as a content identifier is received. In some embodiments, the content identifier can comprise the identification of one or several pieces of content from the pieces of content stored in the content database of the content library database 303. The media identifier can be received by the user device 106 from the user or by the supervisor device 110 from the supervisor. The media identifier can be further received by the one or several servers 102 from the user device 106 or from the supervisor device 110.

After the media identifier has been received, the process 950 proceeds to block 956 wherein a commenter identifier is received. In some embodiments, the commenter identifier can identify a user or supervisor as a commenter for a commenting session. In some embodiments, the commenter identifier can comprise a username, the name of the commenter, a unique user identifier, password, biometric information, a picture, or the like. The commenter identifier can be received by the user device 106 from the user or by the supervisor device 110 from the supervisor. In some embodiments, a single commenter identifier can be received, and in some embodiments, multiple commenter identifiers can be received.

After the commenter identifiers have been received, the process 950 proceeds to block 958 wherein a commenting interface is launched. In some embodiments, the commenting interface can include one or several fields for providing the content and/or displaying the content to the commenter which can be, for example, the user of the user device 106 and/or the supervisor using the supervisor device 110. In some embodiments, the commenting interface can include a display panel configured to display the content, one or several control panels such as, for example, one or several scrubbers, configured to control display of the content, a comment panel configured to receive the comment and/or data relevant to the comment, or the like. In some embodiments, the commenting interface can further display all or portions of the evaluation metric including one or several sub portions of the evaluation metric. In some embodiments, the launching of the commenting interface as depicted in block 958 can include the generating and sending of one or several control signals from one or several servers 102 to the devices 106, 110 associated with the users having user identifiers received in block 956. In some embodiments, these one or several control signals can trigger the launch of the commenting interface on the recipient devices 106, 110.

After the commenting interface is then launched, the process 950 proceeds to block 960 wherein the content is provided. In some embodiments, the content can be provided to the devices 106, 110 having launched the commenting interface. In some embodiments, the content can be streamed to these devices 106, 110 such that no download of the content is performed. In some embodiments, the content can be provided to the devices 106, 110 by the one or several servers 102 via, for example, the communications network 120.

After the content has been provided, the process 950 proceeds to block 962 wherein one or several comment identifiers are received. In some embodiments, the comment identifier can be received subsequent to the user manipulation of the commenting interface to indicate an intent to provide a comment. In some embodiments this can include the pressing of one or several buttons or the manipulation of one or several features, virtual or real, on the device 106, 110 or generated as part of the commenting interface.

After the comment identifier has been received, the process 950 proceeds to block 964 wherein a time stamp and/or location are identified. In some embodiments, this step can include the identification of a portion of the content relevant to the comment. In some embodiments, for example, the manipulation of the feature resulting in the generation of the comment identifier of block 962 can further trigger the identification of a time stamp and/or the identification of location within the content such as, for example identification of X, Y coordinates of one or several locations within the content. In some embodiments, this automatically identified timestamp and/or automatically identified location can be modified by one or several user inputs. In some embodiments, for example, the automatically identified timestamp can be modified so as to designate a portion of audio or video content with a starting point such as, for example, starting timestamp and an endpoint such as, for example, an end timestamp. In some embodiments, the automatically identified timestamp and/or automatically identified location information can be generated by the one or several servers 102 and/or the devices 106, 110.

At block 966, an evaluation criteria identifier, also referred to herein as a tag, is received. In some embodiments, the evaluation criteria identifier can identify the evaluation metric and/or the sub portions of the evaluation metric for applying to the content. In some embodiments, for example, the commenter can input an indicator identifying one or several sub portions of the evaluation metric relevant to the comment. This indicator can be input by the user to one of the devices 106, 110 and can be received by the one or several servers from the devices 106, 110.

After the evaluation criteria identifier has been received, the process 950 proceeds to block 968 wherein comment content is received. In some embodiments, comment content can comprise the body of the comment provided by the commenter. The comment content can include, for example, one or several text string, words, sentences, audio or video clips or files, or the like. The comment content can be provided by the user to the devices 106, 110 and can be received by the one or several servers 102 from those devices 106, 110.

After the comment content has been received, the process 950 proceeds to block 970 wherein the comment is stored in the comment database. In some embodiments, this can include generating an entry within the comment database corresponding to the comment, and specifically generating an entry within the sub database of the comment database, which sub database is specific to the content or to the commenter. In some embodiments, the entry can be linked to the piece of content in the content database, which piece of content is associated with the comment, and/or in some embodiments, the entry can be linked to the portion of the evaluation metric identified in block 966. In some embodiments, these links can comprise one or several pointers to one or both of the content database within the evaluation metric database.

After the comment has been stored in the comment database, the process 950 proceeds to decision state 972 wherein it is determined if the commenting process is done. In some embodiments, this determination can be made by the one or several servers 102 in response to inputs received from the devices 106, 110. In some embodiments, for example, at the completion of the commenting session, the user can manipulate a portion of the commenting interface to indicate completion of commenting. This manipulation of the portion of the commenting interface can result in the generation of one or several electrical signals that can be sent to, and received by, the one or several servers 102. These electrical signals can indicate completion of the commenting. If it is determined that commenting is completed, then the process 950 proceeds to block 974 and terminates, if it is determined that the commenting is not complete, then the process 950 returns to block 960. In some embodiments, this determination of the completion of the commenting can be made for each commenter, and thus while the process 950 may terminate for one commenter, the process 950 may continue for other commenters.

Figure 11:
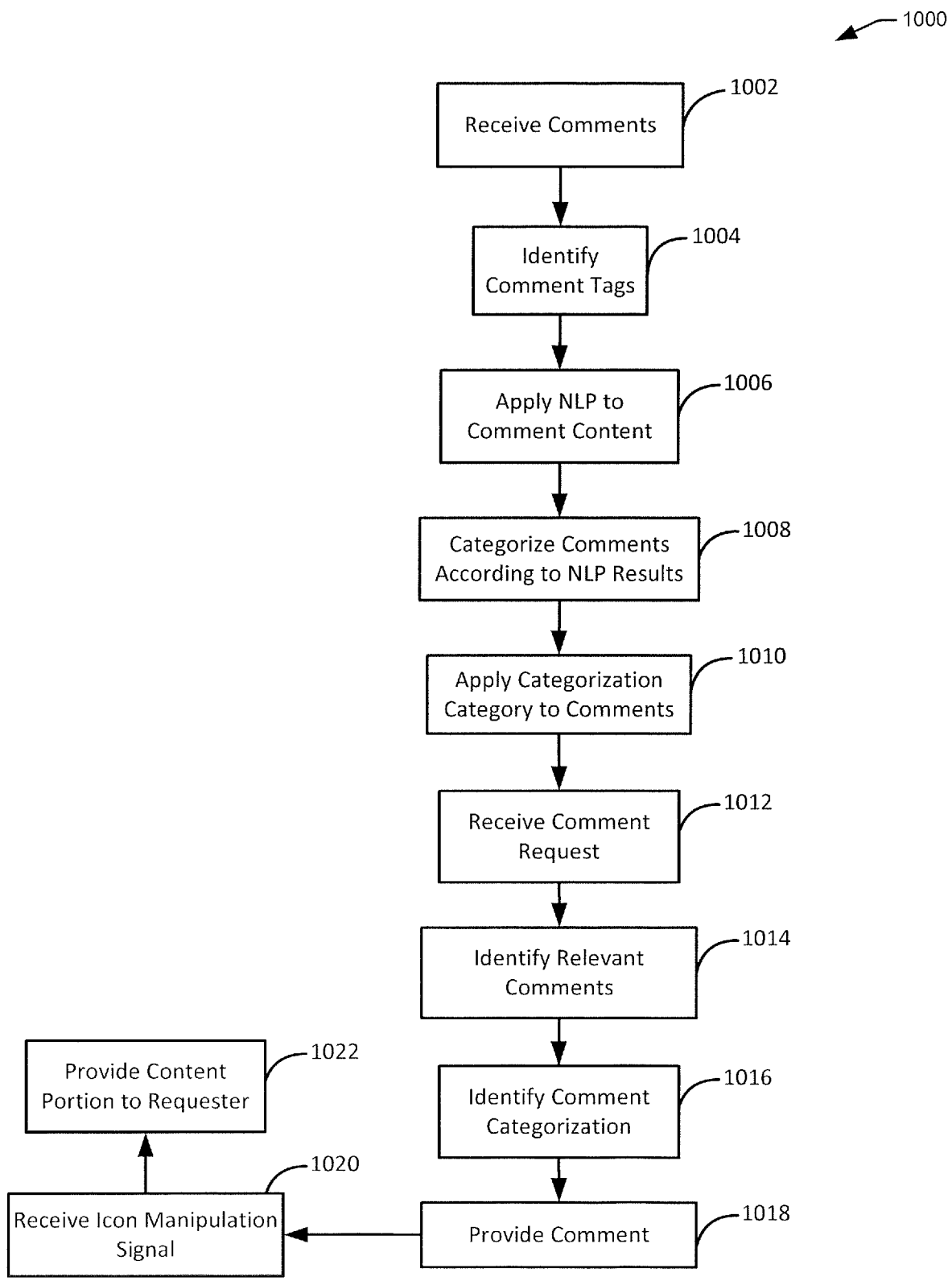
FIG. 11 is a flowchart illustrating one embodiment of a process for providing comments to a user such as an author of one or several pieces of content.

With reference now to FIG. 11, a flowchart illustrating one embodiment of a process 1000 for providing comments to a user such as an author of one or several pieces of content is shown. The process 1000 can be performed by the content distribution network or components thereof. The process 1000 can be performed subsequent to the performing of process 950. The process 1000 begins at block 1002 wherein one or several comments are received. In some embodiments, the one or several comments can be received according to process 900 and/or process 950.

After the one or several comets have been received, the process 1000 proceeds to block 1004 wherein one or several comment tags are identified. In some embodiments, the comment tags can identify one or several sub portions of the evaluation metric identified by the commenter as relevant to the comment. In some embodiments, the comment tags can be identified via links between the comment and the evaluation metric database, and specifically by pointers linking the comment to sub portions of the evaluation metric.

At block 1006, the process 1000 applies Natural Language Processing (NLP) to comment content. In some embodiments, this can include parsing, part of speech tagging, morphological segmentation, stemming, lexical analysis, natural language understanding, relationship extraction, sentiment analysis, or the like. In some embodiments, the NLP can be applied by the one or several servers 102 and can determine whether the comment content is positive or negative. After the NLP is then applied to the comment content, the process 1000 proceeds to block 1010 wherein the comments are categorized. In some embodiments, the comments can be categorized according to one or several tags associated with the comments, according to the results of the NLP analysis, according to the commenter, the class or course, the assignment, or the like.

At block 1012 of the process 1000, the comment request is received. In some embodiments, the comment request can be received from a user by the user device 106 and/or the supervisor device 110. The comment request can identify one or several pieces of content and can request presentation of comments associated with those one or several pieces of content. In some embodiments, the comment request can be received from the user device 106 and/or the supervisor device 110 by the one or several servers 102. The comment request can, in some embodiments, originate from the author of the piece of content for which comments are requested, from a reviewer of the piece of content for which the comments are requested, or from a reviewer of the requested comments. In some embodiments, the comment request can include information identifying a requested subcategory of comments received for one or several pieces of content. In some embodiments, for example, this subcategory can correspond to one or several tags associated with the comments, to one or several authors of the comments, to the positivity or negativity of the comments, or the like.

After the comment request is received, the process 1000 proceeds to block 1014 wherein one or several relevant comments are identified. In some embodiments, these identified relevant comments can be comments requested by the comment request. In some embodiments, these relevant comments can be comments associated with one or several pieces of content. The relevant comments can be identified by the one or several servers 102.

After the relevant comments have been identified, the process 1000 proceeds to block 1016, wherein comment categorization is identified. In some embodiments, this can include identifying the some or all of the relevant comments and/or comments belonging to the requested subcategory of comments specified in the comment request. In some embodiments, the comment categorization can be identified according to data and/or metadata associated with the comments, according to the NLP analysis performed on the comments, according to links between the comments, the content database, and/or the evaluation metrics, or the like. In some embodiments, the identification of the comment categorization can include the matching of the subcategory of requested comments with the categorization applied to the comments in block 1010. The comment categorization can be identified by the one or several servers 102.

After the identifying of the comment categorization, the process 1000 proceeds to block 1018, wherein comments are provided to the user who requested comments in block 1012. In some embodiments, the comments can comprise the requested comments, the comments associated with one or several pieces of content, and/or a subcategory of the comments associated with one or several pieces of content. In some embodiments, the comments can be provided to the user via the comment interface, and specifically, the comments can be provided to the user device 106 and/or the supervisor device 110 by the one or several servers 102, and the comments can be provided to the user by the user device 106 and/or the supervisor device 110 via the I/O subsystem 526 operating the comment interface. In some embodiments, the comments can be provided to the user in the form of one or several icons overlaying all or portions of the content and/or overlaying all or portions of an icon, image, or feature associated with the content. In some embodiments in which the content comprises an audio or video file, 3D or 4D video, a virtual reality or augmented reality file, a simulation or simulation video, the comments can be provided in the form of one or several icons overlaying a scrub bar displayed as part of the commenting interface, and in embodiments in which the content comprises an image file or text file, the comments can be provided in the form of one or several icons overlaying the relevant portion of the image or text. In some embodiments, the one or several icons corresponding to comments can be active such that upon manipulation, the content portion(s) associated with the comment is provided to the user and/or the comment and/or the comment content is provided to the user.

After the comments are provided, the process 1000 proceeds to block 1020, wherein a content icon manipulation signal is received. In some embodiments, this can include a request for content associated with one or several comments and/or a request for the comment and/or the comment content. In some embodiments, for example, the user can manipulate an icon associated with a comment by, for example, hovering the cursor over the icon and selecting the icon. In some embodiments, the manipulation of this icon can result in the generation of an electrical signal indicating manipulation of the icon, which signal can trigger the providing of content associated with the comment and/or the providing of the comment and/or the comment content. In some embodiments the manipulation signal can be received at the user device 106 and/or the supervisor device 110 from the user via the I/O subsystem 526, and the manipulation signal can be received by the one or several servers 102 from the user device 106 and/or the supervisor device 110.

After the icon manipulation signal has been received, the process 1000 proceeds to block 1022, wherein the content corresponding to the icon manipulation signal is requested and provided. In some embodiments, the receipt of the icon manipulation signal can automatically result in the querying of the comment database for links between the comment database and the content database. When identified, these links can be followed and the portion of content connected by these links can be provided to the user. In some embodiments in which the content comprises an audio or video file, the following of these links can include the automatic moving of the scrub bar along the playback line to the location of content corresponding to the link. After the content has been provided, the process 1000 can terminate, if an additional icon manipulation signal has been received, the process 1000 can return to block 1020, or if an additional comment request has been received, the process 1000 can return to block 1012.

Figure 12:
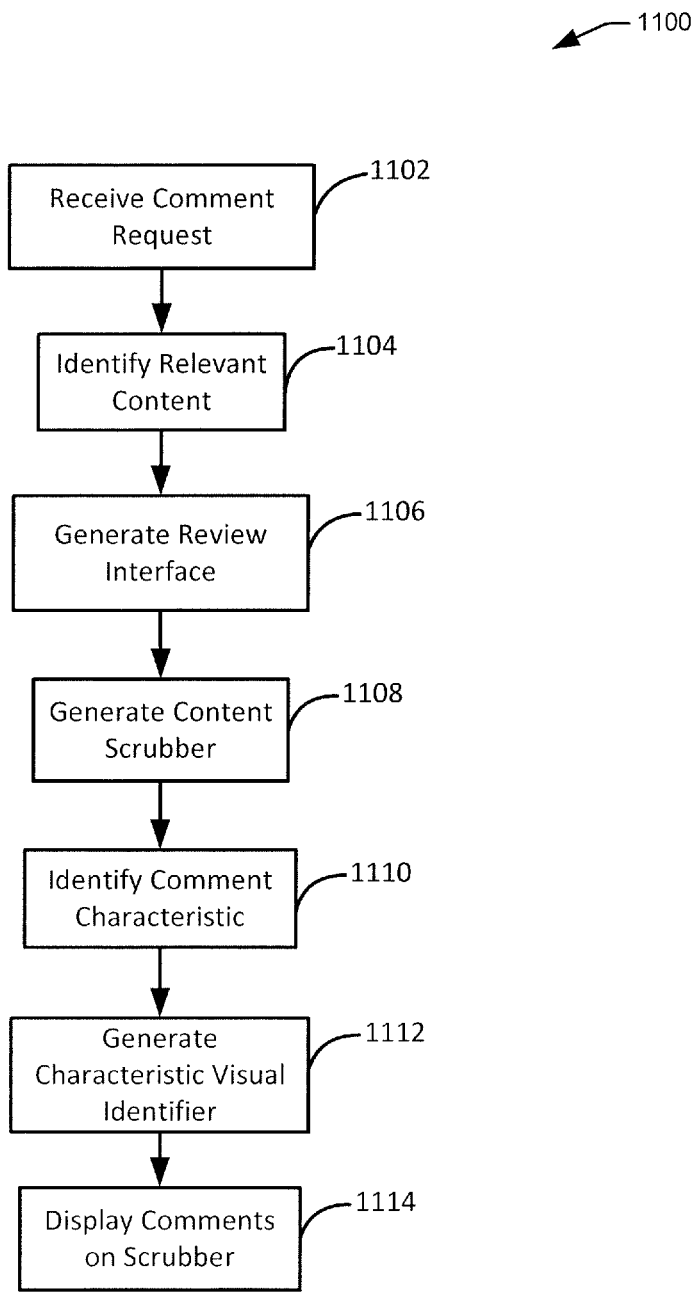
FIG. 12 is a flowchart illustrating one embodiment of a process for displaying comments.
Figure 13:
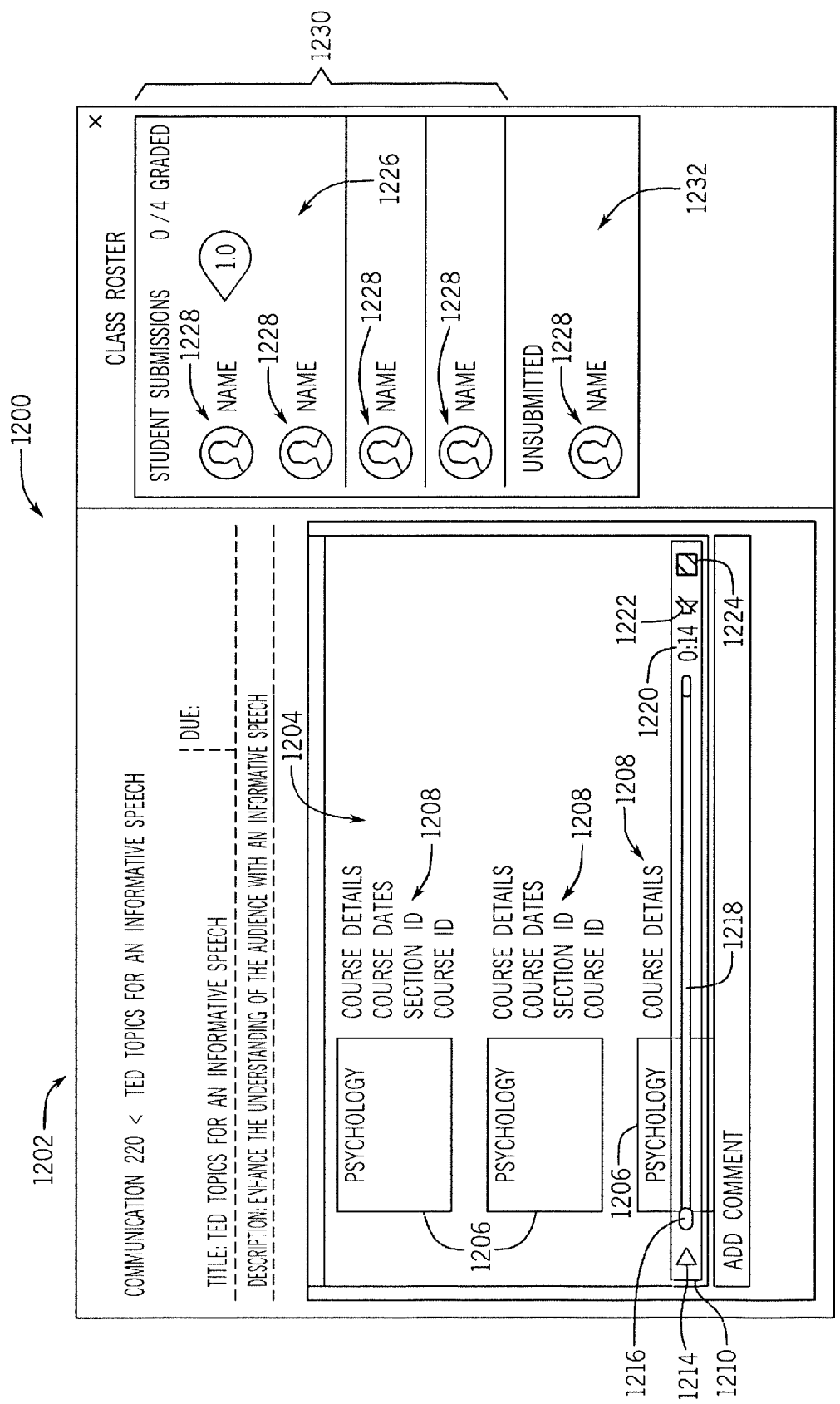
FIG. 13 is an illustration of one embodiment of a selection view of a user interface.

With reference now to FIG. 12, a flowchart illustrating one embodiment of a process 1100 for displaying comments is shown. The process 1100 can be performed by the content distribution network 100 or components thereof. The process 1100 can be performed as a part of, or in the place of the steps of blocks 1012-1018 of FIG. 11. The process 1100 begins at block 1102, wherein a comment request is received. In some embodiments, the comment request can be received from a user by the user device 106 and/or the supervisor device 110. The comment request can identify one or several pieces of content and can request presentation of comments associated with those one or several pieces of content. In some embodiments, the comment request can be received from the user device 106 and/or the supervisor device 110 by the one or several servers 102. The comment request can, in some embodiments, originate from the author of the piece of content for which comments are requested, from a reviewer of the piece of content for which the comments are requested, or from a reviewer of the requested comments. In some embodiments, the comment request can include information identifying a requested subcategory of comments received for one or several pieces of content. In some embodiments, for example, this subcategory can correspond to one or several tags associated with the comments, to one or several authors of the comments, to the positivity or negativity of the comments, or the like.

After the comment request is received, the process 1100 proceeds block 1104 wherein relevant content to the comment request is identified. In some embodiments, this relevant content can be identified based on information contained within the request. This information can, for example, identify the course, section, assignment, teacher, or the like for which comment data is being requested. In some embodiments, the relevant content can be identified by comparing metadata associated with pieces of content to data contained in the content request. Pieces of content having metadata matching the data contained in the content request can be identified as relevant, whereas pieces of content lacking metadata matching the data contained in the content request can be identified as irrelevant. In some embodiments, the identification of relevant content can be performed by the one or several servers 102.

After the relevant content has been identified, the process 1100 proceeds to block 1106, wherein a review interface is generated. In some embodiments, the generation of the review interface can include the generating and sending of a signal from the one or several servers 102 to the user device 106 and/or the supervisor device 110 requesting and/or directing the I/O subsystem 526 to launch the review interface. In some embodiments, the review interface can be similar and/or identical to the commenting interface. The review interface can include one or several fields for reviewing the content, for displaying comments associated with the content, for displaying all or portions of the evaluation metric, or the like.

After the review interface has been generated, the process 1100 proceeds to block 1108, wherein the content scrubber, also referred to herein as the content scrub bar, the scrub bar, or the scrubber, is generated. In some embodiments, the content scrubber can be generated with the review interface as a part of the review interface. The scrub bar is moveable along a playback line to control a location within audio or video content. In some embodiments, the generation of the content scrubber can be directed by the one or several servers 102 as part of the request or command from the one or several servers 102 to launch the review interface, and in some embodiments, the generation of the content scrubber can be directed by the one or several servers 102 independent of the request or command from the one or several servers 102 to launch the review interface.

After the content scrubber is generated, the process 1100 proceeds to block 1110, wherein comments associated with the relevant content of block 1104 is identified and one or several characteristics of those comments are identified. In some embodiments, this can include identifying content associated with the relevant content based on the links between the comments and the content, and specifically linking comments in the comment database with pieces of content in the content database. In some embodiments, one or several attributes of the relevant comments can be identified according to, for example, the NLP analysis, tags associated with the comments, comment metadata, or the like. In some embodiments, the comments can be classified according to at least one of: author; tag(s); relevant evaluation metric or evaluation metric sub-portion; and positivity or negativity. The comments can be characterized by the one or several servers 102.

After the comments have been characterized and/or after one or several comment characteristics have been identified, the process 1100 proceeds to block 1112, wherein a characteristic visual identifier is generated for some or all of the comments. In some embodiments, the characteristic visual identifier can comprise an icon having a size, text, value, color, pattern, or the like to allow visual identification of related comments. In some embodiments, for example, comments having the same author can have a same or similar color, or a same or similar pattern. In some embodiments, for example positive comments can have a same or similar color or a same or similar pattern, and negative comments can have a same or similar color and a same or similar pattern. In some embodiments, the characteristic visual identifier can be generated by the one or several servers 102.

After the characteristic visual identifier has been generated, the process 1100 proceeds to block 1114, wherein the visual identifiers associated with the comments are overlaid on all or portions of the content, or more specifically are overlaid on the scrubber or alternatively are overlaid in the window within which the content is provided. In some embodiments, for example, the visual identifiers can be overlaid on the scrubber to identify portions of the content along the playback line relevant to the comments. In some embodiments, for example, the visual identifier associated with a comment can be overlaid on the scrubber bar at the location along the playback line corresponding to the time of one or several time stamps associated with the comment. In some embodiments, the comments can be displayed or overlaid on the scrubber bar in the review interface. In some embodiments, the display of the comments on the scrubber can include the generation and sending of one or several control signals from the one or several servers 102 to the I/O subsystem 526 of the user device and/or the supervisor device 110.

With reference now to FIGS. 13 through 16, illustrations of embodiments of a user interface and specifically of the commenting interface 1200 are shown. The interface 1200 can be generated by the user device 106 and/or the supervisor device 110, and specifically by the I/O subsystem 526 of the same. The interface 1200 can be configured to provide information to the user of the user device 106 or of the supervisor device 110 and/or to receive inputs from the user. The user interface 1200 can comprise one or several fields, windows, manipulable fields, or the like. In some embodiments, the user interface 1200 can comprise a selection view 1202.

The selection view 1202 can include a content window 1204 displaying content icons 1206 visually representing selectable pieces of content or selectable groups of pieces of content. In some embodiments, the content icons 1206 can be linked to the content database. The content window 1204 can further include one or several content data displays 1208. The content data displays 1208 can comprise one or several text strings. In some embodiments, each of the content icons 1206 is associated with a content data display 1208 in a pairwise relationship, and the text strings in the content data display 1208 can identify one or several attributes of the one or several pieces of content associated with the content data display 1208 and that therewith associated content icon 1206. In some embodiments, these one or several attributes can include, for example, course details, course states, section ID, course ID, or the like. In some embodiments, one or both of a content icon 1206 and the content data display 1208 can be a manipulable, active component of the user interface 1200 to allow the user, via manipulation of the one or both of the content icons 1206 in the content data display 1208, to access the one or several pieces of content therewith associated.

The content window 1204 can further include a scrubber bar 1210, also referred to herein as a scrubber 1210 or a scrubber bar 1210. The scrubber 1210 can include one or several control features including a play feature 1214 that can allow the starting in the stopping of the playing of one or several pieces of content, a shuttle 1216 that is movable along a playback line 1218 to control a displayed position and/or a played position within the one or several pieces of content, a clock feature 1220 configured to display time data indicative of a position within the one or several pieces of content, a volume control 1222, and a window size control 1224 configured to allow the expansion or contraction of the content window 1204.

The selection view 1202 can further include an author window 1226. In some embodiments, the author window 1226 can identify one or several authors of one or several pieces of content associated with one or several of the content icons 1206 displayed in the content window 1204. In some embodiments, these one or several authors identified in the author window 1226 can be groups of users such as, for example one or several groups of users corresponding to students in a course, class, section, or the like.

The one or several authors can each be identified via an author icon 1228 which can include, for example, an icon indicative of the author associated with the author icon 1228 and a text string identifying the author associated with the author icon 1228. In some embodiments, the author window 1226 can segregate author icons into a first group 1230 and a second group 1232. In some embodiments, the first group 1230 can include author icons 1228 identifying authors that have submitted one or several pieces of content, and the second group 1232 can include one or several author icons 1228 identifying authors that have not yet committed one or several pieces of content. In some embodiments, these first and second groups 1230, 1232 can be specific to one of the content items 1206 and therewith associated one or several pieces of content or can be relevant to a group of content items 1206 and that therewith associated one or several pieces of content.

Figure 14:
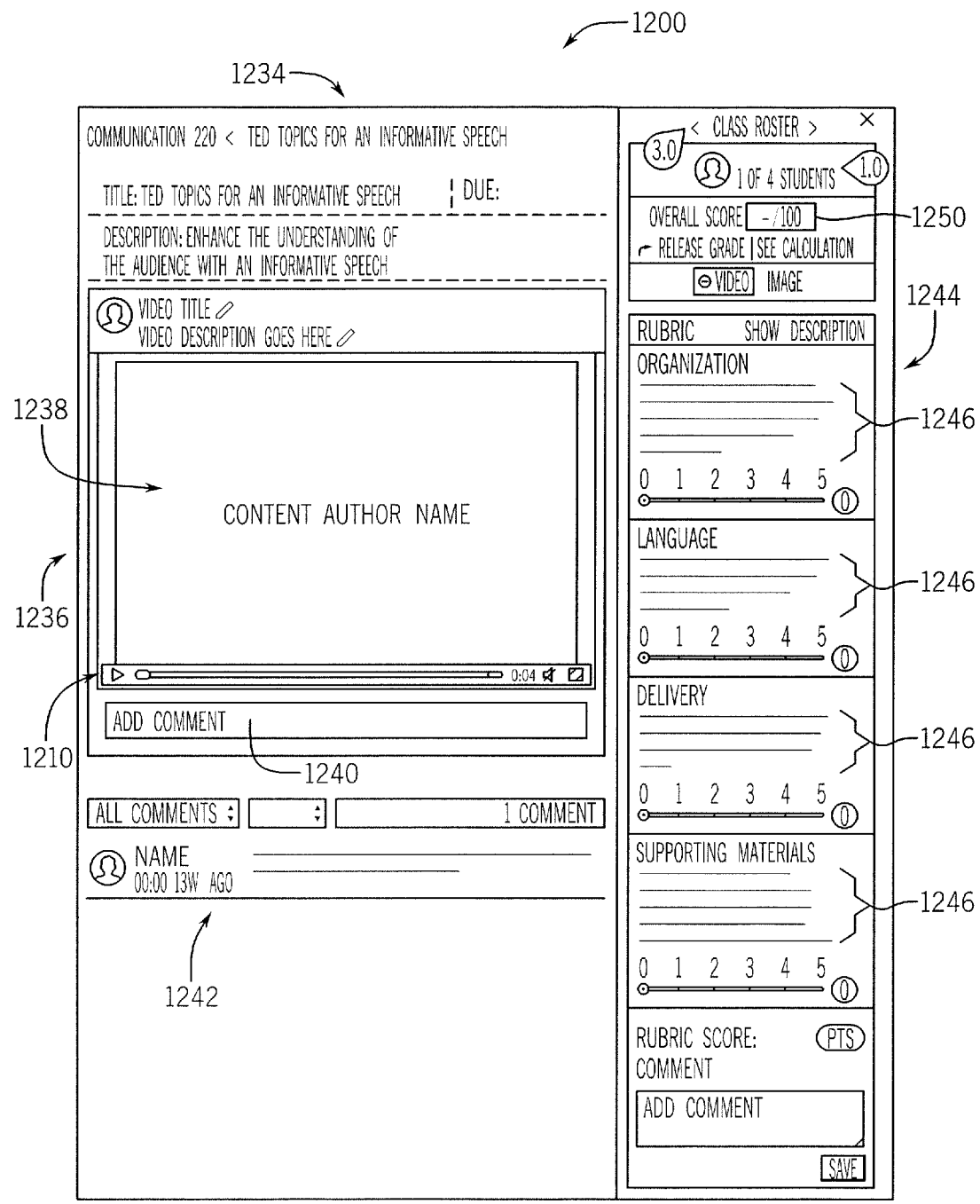
FIG. 14 is an illustration of one embodiment of a commenting view of a user interface.

With reference now to FIG. 14, one embodiment of the commenting view 1234 of the user interface 1200 is shown. The commenting view 1234 includes a content/comment interface 1236 comprising the scrub bar 1210 and a viewing window 1238. The viewing window 1238 can display one or several pieces of content to the user. In some embodiments in which the one or several pieces of content can comprise image, text, or video content, the one or several pieces of content can be displayed and/or provided to the user in the viewing window 1238. In embodiments in which the one or several pieces of content comprise audio content, the viewing window 1238 can remain blank or can display one or several images, animations, or videos that are related or unrelated to the audio content.

The scrub bar 1210 can control the display of the one or several of the pieces of content in the viewing window 1238 and the navigation through those one or several pieces of content in the viewing window 1238. The content/comment interface 1236 can further include a comment field 1240 that can be manipulable to allow the providing of one or several comments associated with the piece of content currently being displayed in the viewing window 1238. In some embodiments, the comment field 1240 can comprise a button manipulable to allow entry of a comment, a field in which one or several text strings can be entered, or the like.

The content/comment interface 1236 can further include a comment log 1242 that can display all or portions of one or several comments, or an identifier representative of one or several comments. In some embodiments, the comments can be displayed within the comment log 1242 in chronological order according to how the one or several comments were received, or according to the position within the piece of content with which they are associated. In some embodiments, comments displayed in the comment log 1242 can include an identifier of the source of the comment such as, for example, one or several of: and identifier of the author of the comment; an identifier of the time and/or date that the comment was received; an identifier of the amount of time elapsed since receipt of the comment; and an icon representative of the author of the comment.

The commenting view 1234 can further include a metric viewer 1244. The metric viewer 1244 can display information relating to an evaluation metric for applying to the piece of content displayed in the content/comment interface 1236 and information relating to the application of the evaluation metric to the piece of content displayed in the content/comment interface 1236. In some embodiments, the evaluation metric can be displayed such that one or several metric subcomponents are displayed. As depicted in FIG. 14, the evaluation metric subcomponents can be each displayed via a metric subcomponent window 1246 that can include a metric input feature 1248 such as, for example, a slider. In some embodiments, each of the metric subcomponent windows 1246 can be configured to allow a user input indicating, for example, a value characterizing the application of the metric subcomponent to the associated piece of content. In some embodiments, the values for a plurality of metric subcomponents can be aggregated and displayed in an aggregation field 1250.

Figure 15:
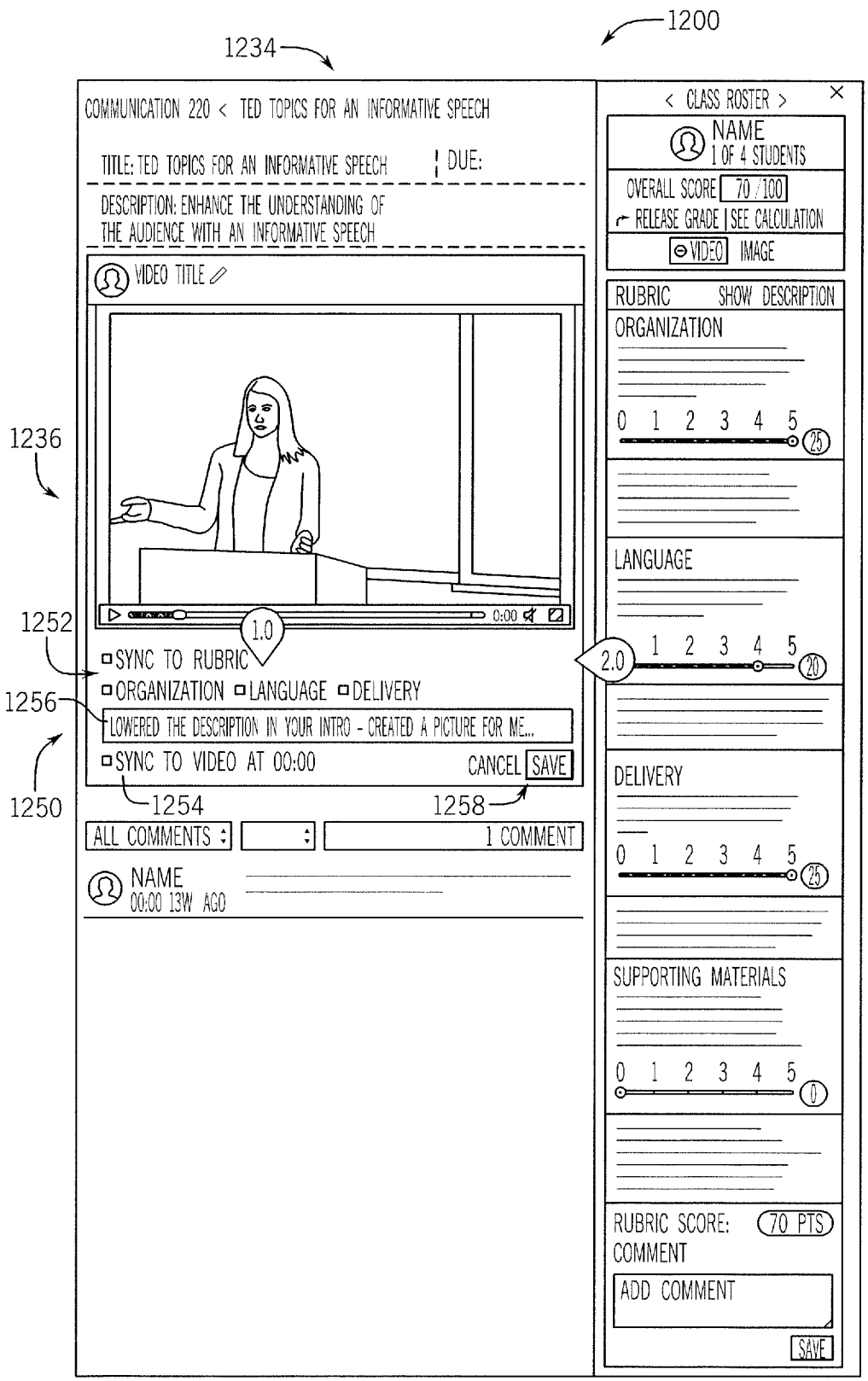
FIG. 15 is an illustration of one embodiment of a commenting view of a user interface including a commenting panel.

With reference now to FIG. 15, one embodiment of the commenting view 1234 during receipt of a comment is shown. As seen in FIG. 15, after actuation of the comment field 1240, a comment panel 1250 can be displayed in the commenting view 1234. The comment panel 1250 can include one or several metric features 1252. The one or several metric features 1252 can be manipulated by the user to indicate a relationship between the comment and one or several portions of the evaluation metric, and specifically between the comment and one or several metric subcomponents. The comment panel 1250 can include a portion feature 1254 that can link the comment to a portion of the content. In some embodiments, the portion feature 1254 can allow the user to enter one or several times or time ranges and/or one or several X, Y coordinates identifying the portion of the piece of content to which the comment is relevant. In some embodiments, for example, when the piece of content is a video file or an audio file, the user can manipulate the portion feature 1254 and one or several timestamps corresponding to the beginning or end of the portion of the piece of content relevant to the comment can be identified. In some embodiments, the user can edit and/or enter times corresponding to the beginning or end of the portion of the piece of content relevant to the comment. The comment panel 1250 can include a comment entry window 1256 in which the comment content can be entered, and in some embodiments, the comment panel 1250 can include one or several buttons 1258 that can be manipulated to cancel and/or discard the comment and/or to save the comment.

Figure 16:
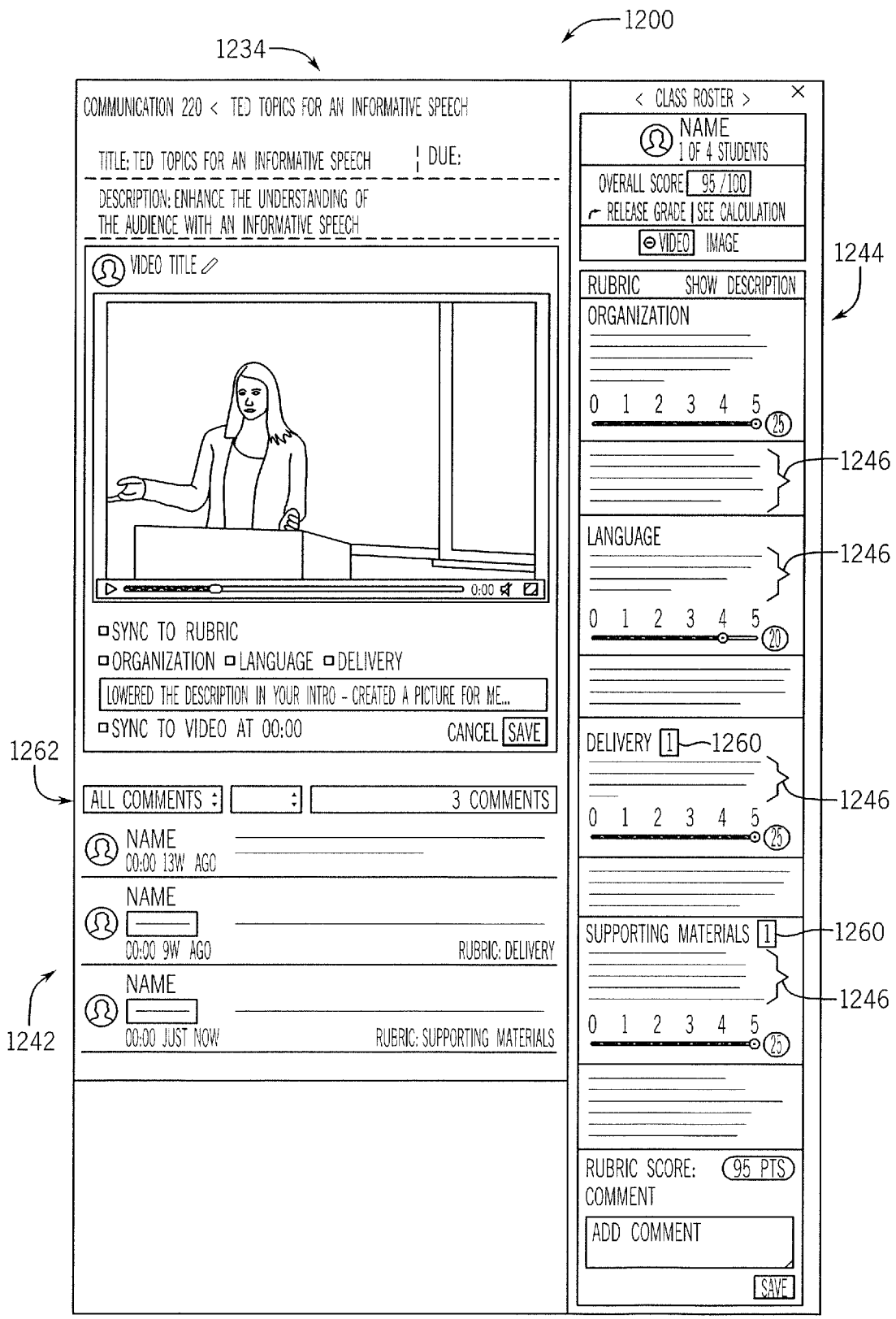
FIG. 16 is an illustration of one embodiment of a commenting view of a user interface including content tags.

With reference now to FIG. 16, one embodiment of the commenting view 1234 after receipt of a comment is shown. As seen in FIG. 16, three comments are displayed in the comment log 1242. In some embodiments, these comments in the comment log 1242 include an identifier of the source of the comment. This identifier can be, for example, one or several of: and identifier of the author of the comment; an identifier of the time and/or date that the comment was received; an identifier of the amount of time elapsed since receipt of the comment; and an icon representative of the author of the comment. As further seen in FIG. 16, the metric viewer includes content tags 1260. In some embodiments, a content tag can be displayed in a metric subcomponent window 1246 when a comment relevant to that metric subcomponent has been identified via, for example, the one or several metric features 1252 of the comment panel 1250. In some embodiments, the content tag 1260 can further include a character such as a numeral indicating the number of comments relevant to the metric subcomponent.

In some embodiments, the user interface 1200 can further include one or several comment filter features 1262. In some embodiments, the comment filter features 1262 can allow the user to input one or several filtration parameters wherewith the comments displayed in the comment log 1242 can be filtered. These filtration parameters can relate to, for example, metric subcomponents associated with comments, comment authors, date and/or time of comment receipt, comment age (amount of lapsed time since receipt of a comment), comment content as ascertained via NLP analysis, or the like.

In some embodiments, a user can select one of the content icons 1206 in the selection view 1202 of the user interface 1200. The user interface 1200 can update to display the commenting view 1234. The user can manipulate one or several features of the scrub bar 1210 to cause the display of the content in the viewing window 1238. The user can then manipulate the comment field 1240, which can cause the display of the comment panel 1250. The user can manipulate one or several of the metric features 1252 to identify the relationship between the comment and the metric subcomponents that can be displayed in the metric viewer 1244. The user can manipulate the portion feature 1254 to automatically identify the portion of the content relevant to the comment and/or can manually enter or identify the portion of the content relevant to the comment. The user can then input comment content in the comment entry window 1256 and can store the comment by manipulation of one of the one or several buttons 1258 to save the comment. The comment can be saved in the content database and pointers linking the comment to the therewith associated metric subcomponents and the identified portions of the content can be generated. In some embodiments, the user interface 1200 can update the metric viewer 1244 to include one or several content tags 1260 identifying the user manipulation of the metric features 1252 indicating the relationship between the comment and the metric subcomponents, or the user interface 1200 can update the metric viewer 1244 to update numerals indicative of the number of comments relevant to the metric subcomponents. The user interface 1200 can be further updated to include the new comment in the comment log 1242 and/or to display an indicator of the comment in the viewing window 1238 and/or on the scrub bar 1210.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices, and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
memory comprising:
   content data including a content linked to a content metadata and to an author data identifying an author of the content and instructor of a learning course;
   evaluation criteria associated with the content metadata and comprising an evaluation metric indicating an effectiveness of the content; and
   a plurality of sub criteria;
a processor configured to:
   receive a portfolio comprising a complain plurality of artifacts comprising a work product of an evaluatee, the work product comprising the content, and the evaluatee comprising the author;
   provide an artifact of the plurality of artifacts to an evaluator;

receive:
  a first indication comprising a first comment identifying a first portion of the artifact, a first placement on a scrub bar or a first image coordinate, and a first portion of the evaluation criteria comprising a first user input identifying a first sub criteria in the plurality of sub criteria relevant to the first comment, wherein the first comment comprises a first timestamp;
  a second indication comprising a second comment identifying a second portion of the artifact, a second placement on the scrub bar or a second image coordinate, and a second portion of the evaluation criteria comprising a second user input identifying a second sub criteria in the plurality of sub criteria relevant to the second comment, wherein the second comment comprises a second timestamp;
assign a value to the first indication and to the second indication identifying the evaluator as a source of the first indication and the second indication;
receive:
  a first evaluation of the artifact based on the evaluation criteria and the first indication; and
  a second evaluation of the artifact based on the evaluation criteria and the second indication;
compare and indicate differences between the first evaluation and the second evaluation of the artifact, the first indication and the second indication, and the first portion and the second portion of the artifact.

2. The system of claim 1, wherein the processor is further configured to select the evaluator.

3. The system of claim 1, wherein an identified portion of the evaluation criteria comprises a sub-criterion.

4. The system of claim 1, further comprising a user device configured to:
  display the first evaluation of the artifact;
  display the first indication; and
  display the first portion of the artifact.

5. The system of claim 4, wherein a comparison of the first evaluation and the second evaluation of the artifact further comprises:
  generation of a difference value, wherein the difference value characterizes a degree of difference between the first evaluation and the second evaluation;
  retrieval of an acceptance threshold, wherein the acceptance threshold is a value demarking levels of acceptable and unacceptable differences between the first evaluation and the second evaluation; and comparing the difference value to the acceptance threshold.

6. The system of claim 5, further comprising comparing the first indication and a first portion of the artifact with the second indication and a second portion of the artifact when the comparison of the difference value to the acceptance threshold indicates an unacceptable level of difference between the first evaluation and a second evaluation.

7. The system of claim 5, wherein the processor is further configured to automatically generate a final score based on the first indication.

8. The system of claim 1, wherein the memory further comprises:
  the plurality of artifacts;
  the first indication;
  the first evaluation, and the second evaluation.

9. The system of claim 1, wherein the first indication comprises a plurality of first tags and wherein the second indication comprises a plurality of second tags.

10. The system of claim 1, wherein the processor is further configured to provide an invention based on the differences between the first evaluation and the second evaluation of the artifact, the first indication and the second indication of the evaluation criteria, and the first portion and the second portion of the artifact.

11. A method comprising:
storing in a memory:
  content data including a content linked to a content metadata and to an author data identifying an author of the content and instructor of a learning course;
  evaluation criteria associated with the content metadata and comprising an evaluation metric indicating an effectiveness of the content; and
  a plurality of sub criteria;
a processor configured for:
  receiving a portfolio comprising a compilation plurality of artifacts comprising work product of an evaluatee, the work product comprising the content, and the evaluatee comprising the author;
  providing an artifact of the plurality of artifacts to an evaluator;
receiving:
  a first indication comprising a first comment identifying a first portion of the artifact, a first placement on a scrub bar or a first image coordinate, and a first portion of an evaluation criteria comprising a first user input identifying a first sub criteria in the plurality of sub criteria relevant to the first comment, wherein the first comment comprises a first timestamp;
  a second indication comprising a second comment identifying a second portion of the artifact, a second placement on the scrub bar or a second image coordinate, and a second portion of the evaluation criteria comprising a second user input identifying a second sub criteria in the plurality of sub criteria relevant to the second comment, wherein the second comment comprises a second timestamp;
assigning a value identifying the evaluator as source of the first indication and the second indication;
receiving:
  a first evaluation of the artifact based on the evaluation criteria and the first indication; and
  a second evaluation of the artifact based on the evaluation criteria and the second indication;
comparing and indicating differences between the first evaluation and the second evaluation of the artifact, the first indication and the second indication, and the first portion and the second portion of the artifact.

12. The method of claim 11, further comprising selecting the evaluator.

13. The method of claim 11, wherein an identified portion of the evaluation criteria comprises a sub-criterion.

14. The method of claim 13, wherein a comparison of the first evaluation and the second evaluation of the artifact further comprises:
  generating a difference value, wherein the difference value characterizes a degree of difference between the first evaluation and the second evaluation;
  retrieving an acceptance threshold, wherein the acceptance threshold is a value demarking levels of acceptable and unacceptable differences between the first evaluation and the second evaluation; and
  comparing the difference value to an acceptance threshold.

15. The method of claim 14, further comprising comparing the first indication and first portion of the artifact with the second indication and second portion of the artifact when the comparison of the difference value to the acceptance threshold indicates an unacceptable level of difference between the first and second evaluation.

16. The method of claim 13, further comprising generating a final scorebased on the first indication.

17. The method of claim 11, wherein the first indication comprises a plurality of first tags and wherein the second indication comprises a plurality of second tags.

18. The method of claim 11, further comprising:
   providing an intervention based on the differences between the first evaluation and the second evaluation of the artifact, the first indication and the second indication of the evaluation criteria, and the first position and the second portion of the artifact.

\* \* \* \* \*